United States Patent
LeDain et al.

(12) 
(10) Patent No.: US 6,246,322 B1
(45) Date of Patent: Jun. 12, 2001

(54) IMPULSE CHARACTERISTIC RESPONSIVE MISSING OBJECT LOCATOR OPERABLE IN NOISY ENVIRONMENTS

(75) Inventors: Timon Marc LeDain, Nepean; Rudy Anthony Vanderbelt, Ottawa, both of (CA); Troy Gene Anderson, Marblehead, MA (US); Michael Bruce Christopher Irwin, Pembroke (CA)

(73) Assignee: Headwaters Research & Development, Inc., Ottawa (CA)

(*) Notice: Subject to any disclaimer, the term of this patent is extended or adjusted under 35 U.S.C. 154(b) by 0 days.

(21) Appl. No.: 09/387,289

(22) Filed: Aug. 31, 1999

Related U.S. Application Data

(63) Continuation-in-part of application No. 08/697,361, filed on Aug. 23, 1996, now abandoned, which is a continuation-in-part of application No. 08/577,861, filed on Dec. 26, 1995, now abandoned.

(51) Int. Cl.[7] .............................. G08B 1/00; G10K 11/00
(52) U.S. Cl. ..................... 340/531; 340/539; 340/566; 340/573.1; 340/825.49; 340/384.1; 367/197; 367/198; 367/199; 381/56
(58) Field of Search ............................ 340/531, 539, 340/566, 573.1, 825.36, 825.49, 384.1; 367/197–199; 381/56–58

(56) References Cited

U.S. PATENT DOCUMENTS

| | | | |
|---|---|---|---|
| 4,101,873 | * 7/1978 | Anderson et al. | 340/539 |
| 4,408,096 | * 10/1983 | Washizuka et al. | 381/110 |
| 4,507,653 | * 3/1985 | Bayer | 340/539 |
| 5,054,007 | * 10/1991 | McDonough | 367/139 |
| 5,294,915 | * 3/1994 | Owen | 340/539 |
| 5,455,560 | * 10/1995 | Owen | 340/539 |
| 5,488,273 | * 1/1996 | Chang | 340/825.22 |
| 5,493,618 | * 1/1996 | Stevens et al. | 381/56 |
| 5,677,675 | * 10/1997 | Taylor et al. | 340/568 |

\* cited by examiner

*Primary Examiner*—Donnie L. Crosland
(74) *Attorney, Agent, or Firm*—Albert Peter Durigon

(57) ABSTRACT

An electronic key or other missing object locator device is responsive to the impulse characteristics of received sounds to distinguish expected impulse-like triggering sounds such as humanly produced hand claps from other impulse-like sounds such as speech or music or non-impulse-like sounds. Errors may be counted whenever the received sounds do not correspond to the expected characteristics of the expected impulse-like triggering sounds. Whenever the expected number of triggering sounds having the expected impulse characteristics have been discriminated and detected, an audible alert is sounded, provided that the errors are not too many. The device of the invention is thereby able to distinguish expected hand claps (or other humanly produced sounds) from non-intended music, speech or other impulse-like or non-impulse-like triggering sounds, rendering it operable even in noisy environments. False alarms from mechanical wave energy are prevented. The user may clap his or her hands in a free manner, and almost any "natural" clap succession, whether or not evenly spaced, and whether or not comparatively-fast or comparatively-slow, will result in the audible alert.

13 Claims, 21 Drawing Sheets

IMPULSE CHARACTERISTIC RESPONSIVE MISSING OBJECT LOCATOR OPERABLE IN NOISY ENVIRONMENTS

CROSS-REFERENCE TO RELATED APPLICATIONS

This application is a continuation-in-part of United States utility patent application Ser. No. 08/697,361, filed Aug. 23, 1996, abandoned, which is a continuation-in-part application of United States utility patent application Ser. No. 08/577,861, filed Dec. 26, 1995, now abandoned, each of the same inventive entity as herein, each incorporated herein by reference.

FIELD OF THE INVENTION

This invention is drawn to the field of electrical communications, and more particularly, to a novel, impulse characteristic responsive missing object locator operable in noisy environments.

BACKGROUND OF THE INVENTION

Electronic key or other missing object finder devices that produce an audible alert signal when the device senses a predetermined triggering signal are known in the art. The heretofore known devices may be divided into "two-unit" and "single-unit" devices. U.S. Pat. No. 4,101,873 to Anderson is representative of the heretofore known two-unit electronic key or other missing object locator devices and U.S. Pat. No. 4,507,653 to Bayer is representative of the heretofore known single-unit devices.

For the two-unit devices, one of the units is always a special-purpose transmitter that provides a predetermined triggering signal, while the other is a dedicated receiver responsive thereto to sound an audible alert. In Anderson, for example, the predetermined triggering signal is provided in practice by a modulated carrier where the modulation is a number of pre-selected single frequency tones. To the extent that the predetermined triggering signals provided by the heretofore known two-unit devices are uniquely unlike the kinds of signals that would otherwise be present in a typical use environment, they generally exhibit good noise immunity and freedom from false activation but are subject to the disutility that the special-purpose transmitters thereof are no less likely to be misplaced than the missing objects to be located thereby.

For the single-unit devices, the predetermined triggering signals are generated by the user who claps, blows a whistle, or otherwise "humanly produces" the intended triggering sounds that activate the device. Although the single-unit electronic key or other missing object finder devices thereby eliminate the problem of a "lost transmitter," the heretofore known devices are highly prone to unintended activation by a plethora of sounds that may be deceptively similar to the intended triggering sounds, such as would be generated by such ambient noise sources as radios, televisions, loud voices and background music, as well as by mechanical vibrations, among other things.

In Bayer, for example, a single-unit device is disclosed that is responsive to a plurality of human-generated intended triggering sounds for emitting audible missing object locator tones. In the illustrated embodiment thereof, the audible tones are produced thereby whenever the user generates four (4) triggering sounds by clapping his or her hands in such way as to temporally order each clap a minimum of eleven-sixteenths (0.6875) seconds apart within four (4) seconds (the "intended plurality of triggering sounds").

A training circuit having an LED that is "turned-off" by hand claps is disclosed to allow the user to learn to space the four required claps in the required time interval and with the required spacing during operation in a "training" mode.

Bayer discloses a signal discrimination technique that is based solely on whether or not the received sounds exhibit a temporal order that corresponds to the temporal order of the intended plurality of triggering sounds to determine whether sounds received by the single-unit missing object locator thereof have been produced by a user or not. If the temporal order of the plurality of actually received sounds does correspond to the temporal order of the intended plurality of triggering sounds, then the audible alert is produced by the Bayer signal discrimination technique; otherwise, it is not. Bayer also discloses a false alarm rejection technique that likewise is based solely on the temporal order of the received sounds. If the temporal order of the plurality of actually received sounds does not correspond to the temporal order of the intended plurality of triggering sounds, then they are rejected as "false," as they are not in accord with the temporal order expected by the corresponding Bayer signal discrimination technique.

The false alarm rejection technique of Bayer rejects noise for no more than a fixed, predetermined time (the so-called "fourth predetermined time"), during which the unit's ability to detect triggering sounds is deactivated. A motion detector is provided which deactivates the unit's ability to detect triggering sounds for no more than the same fixed, predetermined time, whenever the unit's motion itself gives rise to noise.

However, as will readily be appreciated by those of skill in the art, the signal discrimination and false alarm rejection techniques based on the temporal order of received sounds of the Bayer single-unit device are disadvantageous in that they allow the Bayer device to provide an audible output for any four (4) sounds which may happen to occur within the expected temporal order irregardless of whether they arise from an intended human-generated hand clap or from ambient noise such as speech, music and the rest. The audible alert is provided for any received triggering sounds, so long as they exhibit the expected temporal order. Because the Bayer single-unit missing object locator device responds to both the intended triggering sounds as well as to ambient noise, it is subject to annoying false activation by music, speech, or any ambient sources other than the intended hand claps, which renders it generally inoperable in noisy environments and makes it prone to false alarms in day to day use.

Moreover, both the Bayer false alarm rejection technique and motion detection technique that reject noise for no more than a predetermined time give rise to power-draining toggling of the unit "on" and "off" in environments with on-going noise sources, as the unit's ability to detect triggering sounds is deactivated, then activated, and so on repetitively, by the on-going environmental noise. In addition, the Bayer motion detection technique is only effective whenever the unit itself is in motion, but does not detect possible noise conditions when the unit is itself unmoved.

SUMMARY OF THE INVENTION

Accordingly, it is the principal object of the present invention to provide a single-unit missing object locator that is based on impulse characteristics rather than merely on temporal order to provide both signal discrimination and false alarm rejection, that is operable over the average background noise levels to provide an audible alert in response to detection of the expected impulse characteristics of the received triggering sounds, that rejects as noise both non-impulse-like triggering sounds as well as impulse-like triggering sounds arising from speech, music and other ambient impulse-like sound sources thereby preventing false alarms, and that allows the user to generate the expected number of impulse-like triggering signals in a "free" manner, one that eliminates the need to learn, in advance, a rigid actuation sequence, whereby almost any "natural" succession will result in the audible alert.

It is a related object of the present invention to provide such an impulse characteristic responsive missing object locator operable in noisy environments that is sensitive from anywhere within a range (preferably, of about (20) feet) where a typical lost object may be located, that exhibits low power consumption thereby obtaining a long useable battery life, that is insensitive to mechanical vibrations without requiring costly vibration detector mechanisms, and that may readily be implemented at low cost.

It is a further object of the present invention to provide a missing object locator that responds to noise to enter a motion detection state, where it stays for an indefinite time, unless and until a period of quiescence is observed, thereby completely eliminating false alarms.

It is a related object of the present invention to provide such a missing object locator that enters battery-power conserving sleep mode for the indefinite time that it is in motion detection state, thereby preventing battery-draining "on/off" toggling that otherwise would occur in environments having on-going noise sources.

In accord therewith, an impulse characteristic responsive missing object locator is disclosed that is operable over the instantaneous and average background noise levels to sound an audible alert in response to a succession of received impulse-like triggering sounds, so long as they have impulse characteristics that correspond to the impulse characteristics of the expected human-generated triggering sounds and occur within prescribed minimum and maximum repetition rates. In one presently preferred embodiment, the activation sequence may or may not be regularly spaced, so long as the successive claps occur within the prescribed minimum and maximum repetition rates; in this embodiment the succession of human-generated impulse-like triggering sounds is comprised by four (4) human-generated hand claps, although any other suitable impulse-like triggering sounds may be employed without departing from the inventive concepts. In this embodiment, the minimum and maximum repetition rates are five hundred (500) milliseconds and one and six-tenths (1.6) seconds, although any other suitable minimum and maximum expected repetition rates may be employed without departing from the inventive concepts. In another presently preferred embodiment, the preferred four-clap activation sequence may be that sequence which each particular user employs, whether comparatively-fast or comparatively-slow, so long as the first and second successive claps occur within the minimum and maximum repetition rates of expected triggering sounds, and so long as second and third and third and fourth successive claps occur within a preselected tolerance of the interval between the first and second successive claps; in alternative embodiments, the minimum and maximum repetition rates are four hundred (400) and two thousand (2000) milliseconds (plus, as appears more fully below, the length of output two), and five hundred (500) and one thousand five hundred (1500) milliseconds, and the preselected tolerance is two hundred (200) milliseconds, although any other suitable minimum and maximum expected repetition rates and tolerances may be employed without departing from the inventive concepts.

The disclosed impulse characteristic responsive missing object locator of the present invention comprises an analog-to-digital signal discriminator means for providing digital signals representative of whether or not received triggering sounds are fast enough in attack rate to be expected impulse-like triggering signals and louder than the background noise level and a digital detector means cooperative with the analog-to-digital signal discriminator means for providing an output signal upon detecting a certain number of times that successive digital signals occur in any time sequence that is bounded by the minimum and maximum repetition rates of the expected impulse-like triggering sounds. In the preferred embodiment, impulse-like triggering sounds having impulse characteristics that correspond to the impulse characteristics of the expected triggering sounds are isolated from the instantaneous and average background noise levels, from ambient sound sources such as music or speech or mechanical wave energy having impulse characteristics other than those of the expected impulse-like triggering sounds, and from ambient sound sources having other than impulse-like characteristics, thereby enabling the device of the invention to be used in noisy environments.

The analog-to-digital signal discriminator means of the invention includes an envelope detector for providing envelope detector signals having slew rates that correspond to the attack rates of received triggering signals and amplitudes that correspond to the amplitudes of the received triggering signals. First analog-to-digital signal discriminator means are disclosed in one embodiment responsive to the envelope detector signals for providing a first impulse-captured signal if the slew rates thereof exceed a first preselected threshold selected to represent the minimum attack rate of expected impulse-like triggering sounds (rather than impulse-like triggering sounds such as speech or music) . Second analog-to-digital signal discriminator means are disclosed in one embodiment responsive to the envelope detector signals for providing a second impulse-captured and noise-rejected signal if the slew rates thereof exceed a second preselected threshold selected to represent the minimum attack rate of expected impulse-like triggering sounds (rather than non-impulse-like triggering sounds) and so long as the amplitudes thereof exceed the level of the average background noise level by a preselected factor. In the preferred embodiment, where the analog-to-digital signal discriminator means is comprised by both the first and second analog-to-digital signal discriminator means, the first means includes a second order low pass filter and a first comparator, and the second means includes an RC timing network, a resistor-divider network and a second comparator.

In one presently preferred embodiment, the digital detector means includes a processor, a first processor-implemented impulse-captured interrupt routine and a second processor-implemented overflow timer interrupt routine, although the digital detector means of the invention could be implemented with other software structures, or implemented in logic gates, without departing from the inventive concepts. The first processor-implemented impulse-captured interrupt routine and second processor-implemented overflow timer interrupt routine in the preferred embodiment are called by every impulse-captured signal, which awakens the processor from sleep mode. The processor is then operative in accord with these two interrupt routines to determine if a certain number of the impulse-like triggering sounds captured by the analog-to-digital signal discriminator means fall within the prescribed minimum and maximum repetition rates of the expected impulse-like triggering sounds and either sounds the audible alert if they do, or goes back into sleep mode if they do not. In the preferred embodiment, the first processor-implemented impulse-captured interrupt routine includes an alert subroutine to controllably produce the audible alert. Reliable detection and false alarm rejection is thereby obtained, while low power consumption is observed, by the digital means of the present invention.

In another presently preferred embodiment, the digital detector means includes a processor, a processor-implemented impulse-captured interrupt routine and inter-clap pause validate and pulse validate subroutines, although the digital detector means of the invention could be implemented with other software structures, or implemented in logic gates, without departing from the inventive concepts. The processor-implemented impulse-captured interrupt routine in the preferred embodiment is called by an impulse-captured signal of a potential actuation sequence, which awakens the processor from sleep mode. The processor is then operative in accord with the interrupt routine to detect the spacing between the first two (2) claps produced by an individual user, so long as that spacing falls within the expected minimum and maximum repetition rates irrespective of whether that spacing is comparatively-slow or comparatively-fast, and to determine if a certain number of successive impulse-like triggering sounds captured by the analog-to-digital signal discriminator means fall within a prescribed tolerance of the time spacing detected between the first two (2) claps, and either sounds the audible alert if they do, or goes back into sleep mode if they do not. In this embodiment, the processor-implemented impulse-captured interrupt routine includes an alert subroutine to controllably produce the audible alert. Reliable detection and false alarm rejection is thereby obtained, while low power consumption is observed, by the digital means of the present invention.

In a further presently preferred embodiment, the digital detector means includes a processor, a processor-implemented impulse-captured interrupt routine and inter-clap pause validate and pulse validate subroutines, and a motion detection routine. In this embodiment, the impulse-captured interrupt routine operates in substantially the same manner as that of the just described embodiment to detect triggering sequences, but it does not sound the audible alert if it detects a further impulse-captured triggering sound following detection of the requisite number of impulse-captured triggering sounds. The impulse-captured interrupt routine in this manner detects a "virtual" pulse, so that the detector of the invention enjoys the same false alarm rejection rate of a longer expected triggering sound sequence without requiring the user to actually employ that longer sequence. For the presently preferred four (4) clap triggering sequence, the false alarm rejection rate of a five (5) clap triggering sequence is thereby obtained.

In this embodiment, the motion detection routine is called if an impulse-captured and noise rejected signal of a potential actuation sequence does not occur within a predetermined time, preferably one hundred twenty-five (125) milliseconds, of an impulse-captured signal, or if impulse-captured signals of a potential actuation sequence occur too frequently to be expected impulse triggering sounds. Upon detection of either event, which is representative of noise, the processor determines whether other impulse-captured and noise-rejected signals to validate a noise condition, preferably one-thousand (1000) ms, and if validated, the motion detection routine of the processor-implemented detector loops for an indefinite time, unless and until a period of quiescence is observed; otherwise, it goes into sleep mode. In the presently preferred embodiment, the processor-implemented detector in motion detection mode is operative (1) to initiate a count-down timer, preferably a six thousand (6000) ms count-down timer, (2) to reset the count-down timer every time another triggering sound is detected during that time, and (3) to return to sleep mode only when the count-down timer has counted down. The detector of the invention thereby provides an adaptive disable, that adapts itself to the noise environment, and resumes detection of potential actuation sequences of triggering sounds only upon the observation of a period of quiescence, which completely eliminates the possibility of false alarms in noisy environments.

In an alternative embodiment, the processor-implemented detector means is operative to assume battery-conserving low-power mode for the duration of the indefinite time. In this embodiment, the count-down timer is interrupt-enabled and operates (counts) while the processor is in low-power mode. A count-down timer overflow interrupt returns the detector to sleep mode. Other low-power battery-conserving techniques may be employed in accord with the present invention.

In one embodiment, the digital detector means of the present 5 invention further includes digital likelihood estimator means cooperative with the digital detector means for inhibiting the digital detector means upon detecting a certain number of times that said digital signals have characteristics other than the characteristics of the expected impulse-like triggering sounds. In one preferred embodiment, the first processor-implemented impulse-captured interrupt routine and the second processor-implemented overflow timer interrupt routine cooperate so as to count an error whenever successive digital signals occur in any time sequence that is outside the bounds set by the minimum repetition rate of the expected impulse-like triggering sounds. In this embodiment, the first processor-implemented impulse-captured interrupt routine includes a pulse-validate subroutine to distinguish received impulse-like triggering sounds as to whether they exhibit sufficient duration to be expected impulse-like triggering sounds and to count an error if they are not. Provided that the errors counted do not exceed an error threshold, the digital detector means provides the audible alert. The error threshold of the digital likelihood estimator means is selected to provide a "confidence measure" of the likelihood that received impulse-like triggering sounds are indeed humanly produced hand claps. In the preferred embodiment, the error threshold is three (3), although any suitable error threshold could be employed without departing from the inventive concepts.

In another preferred embodiment, a hardware register, an output two (impulse-captured and noise-rejected) pulse counter, is incremented by every output two signal and the processor-implemented impulse-captured interrupt routine includes a pulse-validate subroutine to distinguish received impulse-like triggering sounds as to whether they exhibit sufficient duration to be expected impulse-like triggering sounds and to count an error if they are not of sufficient duration as well as to count an error if they are of too long a duration to be expected impulse-like triggering sounds. In this embodiment, the error count is incremented by one (1) count for the former event and by three (3) counts for the latter event. Provided that the errors counted do not exceed an error threshold, and provided that not too many output two signals have been counted during a potential actuation sequence, the digital detector means provides the audible alert. The error threshold of the digital likelihood estimator means is selected to provide a "confidence measure" of the likelihood that received impulse-like triggering sounds are indeed humanly produced hand claps. In this embodiment, the error threshold is three (3) and the output two pulse counter threshold is five (5), although any suitable error and output two pulse thresholds could be employed without departing from the inventive concepts. A large number of output two pulses received during a potential activation sequence is indicative of mechanical shock.

In a further presently preferred embodiment, the hardware register, an output two (impulse-captured and noise-rejected) pulse counter, is incremented by every output two signal and the processor-implemented impulse-captured interrupt routine includes a pulse-validate subroutine to distinguish received impulse-like triggering sounds as to whether they exhibit sufficient duration to be expected impulse-like triggering sounds and to count an error if they are not of a first duration, to count an error if they are not of a sufficient duration greater than the first duration, to count an error if they are of too long a duration to be expected impulse-like triggering sounds, as well as to decrement an already non-zero error count if they are of the requisite duration. In this embodiment, the error count is incremented by two (2) counts for the former event, by one (1) count for the antepenultimate event, by three (3) counts for the penultimate event and the error count is incremented by one (1) count for the latter event. In this embodiment, the error threshold is three (3) and the output two pulse counter threshold is five (5), although any suitable error and output two pulse thresholds could be employed without departing from the inventive concepts.

BRIEF DESCRIPTION OF THE DRAWINGS

Other objects, advantageous features and inventive aspects of the present invention will become apparent as the invention becomes better understood by referring to the following detailed description of the preferred embodiments thereof, and to the drawings, wherein.

DETAILED DESCRIPTION OF THE PREFERRED EMBODIMENTS

Figure 1:
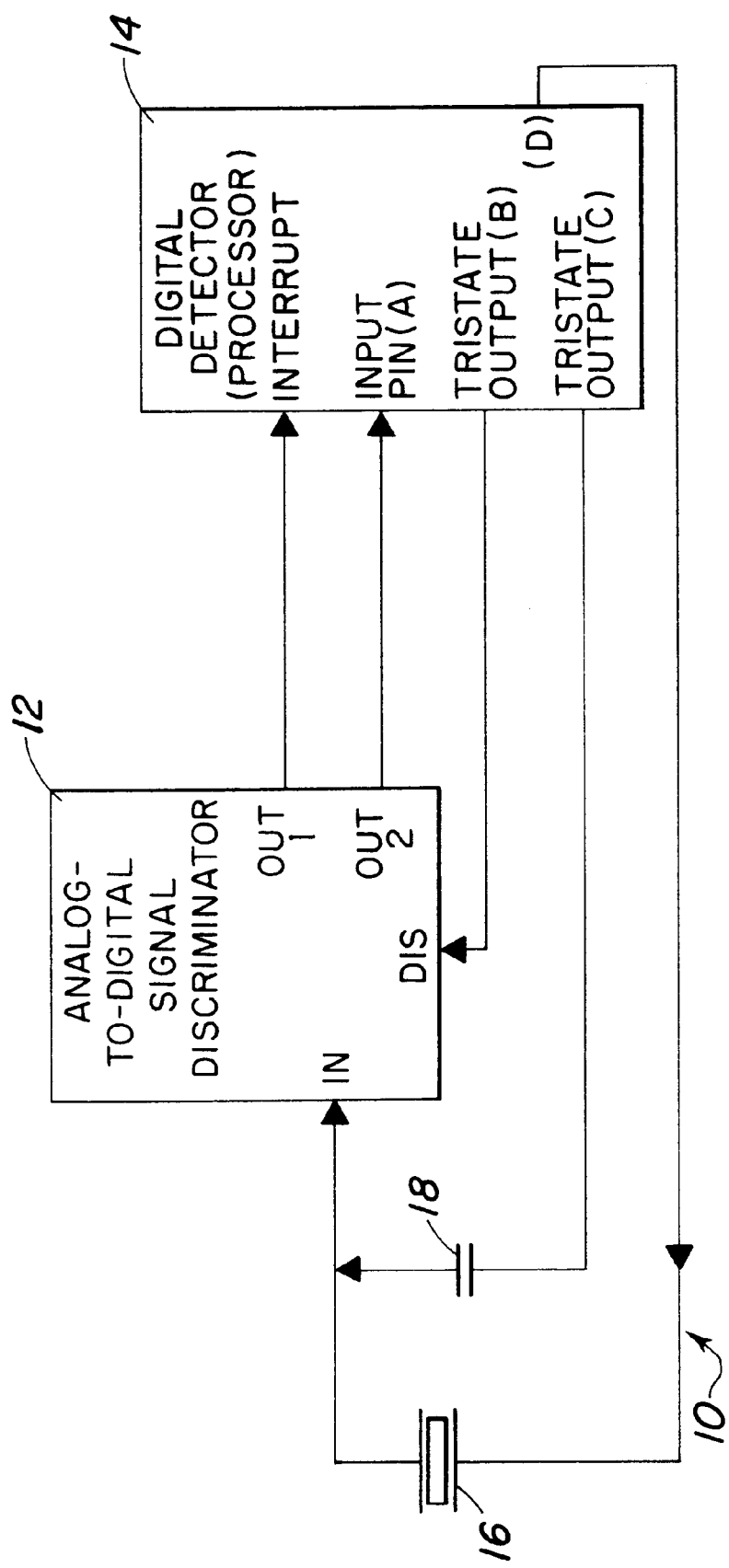
FIG. 1 is a block diagram of the analog-to-digital signal discriminator and digital detector of the impulse characteristic responsive missing object locator operable in noisy environments in accord with the present invention.

Referring now to FIG. 1, generally designated at 10 is a block diagram of the impulse characteristic responsive missing object locator operable in noisy environments in accord with the present invention. The device 10 includes an analog-to-digital signal discriminator 12 to be described, a digital detector 14 to be described connected to the analog-to-digital signal discriminator 12, and an input transducer 16 connected to both the analog-to-digital signal discriminator 12 and the digital detector 14. In the preferred embodiment, the analog discriminator 12 and the digital detector 14 are fabricated as a hybrid printed circuit board having comparator and CPU integrated circuits in a manner well-known to those of skill in the art. In the preferred embodiment, the analog discriminator 12 is implemented with CMOS micropower op-amps that have extremely high input impedance, such as the commercially-available TLC-27L4 integrated circuit. The digital detector 14 of the embodiment of the FIGS. 4–8 is implemented with a commercially-available 68HC05 integrated circuit, and in the embodiments of the FIGS. 9–12 and FIGS. 13–18, is implemented with a commercially-available HMC-73200. The transducer 16 is preferably a piezoelectric transducer, although any other input transducer that is responsive to input triggering sounds to provide output sound signals that have frequencies, slew rates and amplitudes that correspond to the frequencies, attack rates and amplitudes of the expected impulse-like triggering sounds may be employed. Piezo-transducers are preferred because they both provide a comparatively high output voltage and require no external power source.

The analog-to-digital signal discriminator 12 has a disable input marked "dis" and an analog input marked "in". The discriminator 12 is connected with its "in" input to the output of the transducer 16 so as to receive the sound signals provided thereby. In the preferred embodiment, the analog-to-digital signal discriminator 12 provides at its digital output ports marked "out1" and "out2" digital signals to be described. In the preferred embodiment, the analog-to-digital signal discriminator 12 includes first means to be described for providing at its "out1" digital port an impulse-captured signal if the attack rates of the received triggering sounds exceed a preselected first threshold selected to represent a minimum attack rate of expected impulse-like triggering sounds (as opposed to other impulse-like triggering sounds, such as speech or music) and includes second means to be described for providing at its "out2" digital port an impulse-captured and noise-rejected signal if the slew rates of the received triggering sounds exceed a preselected second threshold selected to represent the minimum attack rate of expected impulse-like triggering sounds (as opposed to non-impulse-like sounds) so long as the amplitude thereof exceeds the level of the average background noise by a preselected factor. In the preferred embodiment, the preselected first threshold is less than the preselected second threshold, which renders the impulse-captured signal provided by the first means more sensitive than the impulse-captured and noise-rejected signal provided by the second means to isolate expected impulse-like triggering sounds from impulse-like triggering sounds that arise from unintended impulse-like triggering sound sources such as music and speech. For this reason, as appears more fully below, the processor of the digital detector 14 is only awakened from its sleep mode in response to the impulse-captured signal, which conserves power and promotes battery life.

The digital detector 14 has an interrupt port marked "interrupt," an input port marked "input pin (A)," two (2) tri-state output ports marked "tri-state output (B)" and "tri-state output (C)," and an output marked output "D." The digital detector 14 is connected to the analog-to-digital signal discriminator 12 and to the transducer 16 with its interrupt port connected to the "out1" output of the discriminator 12, with its input port connected to the "out2" output of the discriminator 12, with its tri-state output (B) connected to the disable input of the discriminator 12 marked "dis" and with its tri-state output (C) connected via an AC coupling capacitor 18 to the analog input port of the discriminator 12 and to the output of the transducer 16. The output "D" is connected to the negative output of the transducer 16 and is driven "low" during sensing. The digital detector 14 is nominally in "sleep" mode and the impulse-captured signal provided by the discriminator 12 is operative to awaken it from sleep mode.

In one embodiment to be described in connection with the description of the FIGS. 4–8, the detector 14, once awakened, is operative to call an impulse-captured interrupt routine and an overflow timer interrupt routine to be described that are cooperative upon detecting a certain number of times that successive impulse-captured signals occur in any time sequence that is bounded by the minimum and maximum repetition rates of the expected impulse-like triggering sounds to provide both an output signal via its tri-state output (C) and the AC coupling capacitor 18 to the transducer 16, which therewith sounds an audible alert, and to provide a disable signal at its tri-state output (B) to the disable input of the discriminator 12, that disables the discriminator 12 so long as the output signal is being provided to the transducer 16 via the tri-state output (C) thereof. During alerting, the outputs "C" and "D" are driven in opposite polarity of one another, which provides twice as much drive voltage to the transducer 16 resulting in doubled volume. Thereafter, the digital detector 14 is operative to toggle tri-state outputs (B) and (C) back to floating state from the driving state, which places the analog-to-digital discriminator 12 back into its sensing mode, and then goes back into its sleep mode until the next impulse-captured interrupt is received on the interrupt port thereof.

In further embodiments to be described in connection with the description of the FIGS. 9–12 and FIGS. 13–18, the detector 14, once awakened, is operative to call an impulse-captured interrupt routine to be described that is operative upon detecting a certain number of times that successive impulse-captured signals occur in a time sequence that is set by an actual user, whether comparatively-fast or comparatively-slow, so long as the actual sequence is bounded by the minimum and maximum repetition rates of the expected impulse-like triggering sounds, to provide both an output signal via its tri-state output (C) and the AC coupling capacitor 18 to the transducer 16, which therewith sounds an audible alert, and to provide a disable signal at its tri-state output (B) to the disable input of the discriminator 12, that disables the discriminator 12 so long as the output signal is being provided to the transducer 16 via the tri-state output (C) thereof. Thereafter, the digital detector 14 is operative to toggle tri-state outputs (B) and (C) back to floating state from the driving state, which places the analog-to-digital discriminator 12 back into its sensing mode, and then goes back into its sleep mode until the next impulse-captured interrupt of a possible actuation sequence is received on the interrupt port thereof. Among other things, the detectors of the embodiments of FIGS. 9–12 and FIGS. 13–18 differ in that the latter calls a motion detection routine to be described.

In one embodiment, as appears more fully below in connection with the description of the FIGS. 4–8, the digital detector 14 includes a digital likelihood estimator that inhibits production of the tri-state output (C) signal upon detecting a certain number of times (1) that successive impulse-captured signals occur in any time sequence that is outside the bounds set by the minimum repetition rate of the expected impulse-like triggering sounds and/or (2) that each impulse-captured signal does not last long enough to be an expected impulse-like triggering sound. By the former, false alarms that would otherwise be produced by impulse-like triggering sounds due to mechanical wave energy, such as jiggling or other physical motion of the object to which the device 10 is attached, that typically has repetition rates outside the bounds set by the minimum repetition rates of the expected impulse-like triggering sounds, are effectively eliminated, without requiring any special vibration detection mechanism, and by the latter, false alarms that would otherwise be produced by short-lived impulse-like triggering sounds due to, for example, speech or music, are effectively eliminated. In embodiment of the FIGS. 4–8, the digital likelihood estimator is run as part of the impulse-captured and overflow timer interrupt routines in a manner to be described. The digital likelihood estimator provides a "confidence measure" of the likelihood that received impulse-like triggering sounds are indeed human-generated hand-claps rather than unintended impulse-like triggering sounds.

In other embodiments, as appears more fully below in connection with the description of the FIGS. 9–12 and FIGS. 13–18, the digital detector 14 includes a digital likelihood estimator that inhibits production of the tri-state output (C) signal upon detecting (1) that impulse-captured and noise-rejected signals either last too long or too short; or last too long, too short or have durations therebetween; to be expected impulse-like triggering sounds and/or (2) that too many impulse-captured and noise-rejected signals have been received during a potential actuation sequence. By the former, false alarms that would otherwise be produced by impulse-like triggering sounds due to mechanical wave energy, such as jiggling or other physical motion of the object to which the device 10 is attached, are effectively eliminated, without requiring any special vibration detection mechanism, and by the latter, false alarms that would otherwise be produced by longer-lived impulse-like triggering sounds due to, for example, acoustic shock, as by dropping of the device 10, are effectively eliminated. In embodiments of the FIGS. 9–12 and FIGS. 13–18, the digital likelihood estimator is run as part of the impulse-captured routine and pulse validate subroutine in a manner to be described. The digital likelihood estimator provides a "confidence measure" of the likelihood that received impulse-like triggering sounds are indeed human-generated hand-claps rather than unintended impulse-like triggering sounds.

Figure 2:
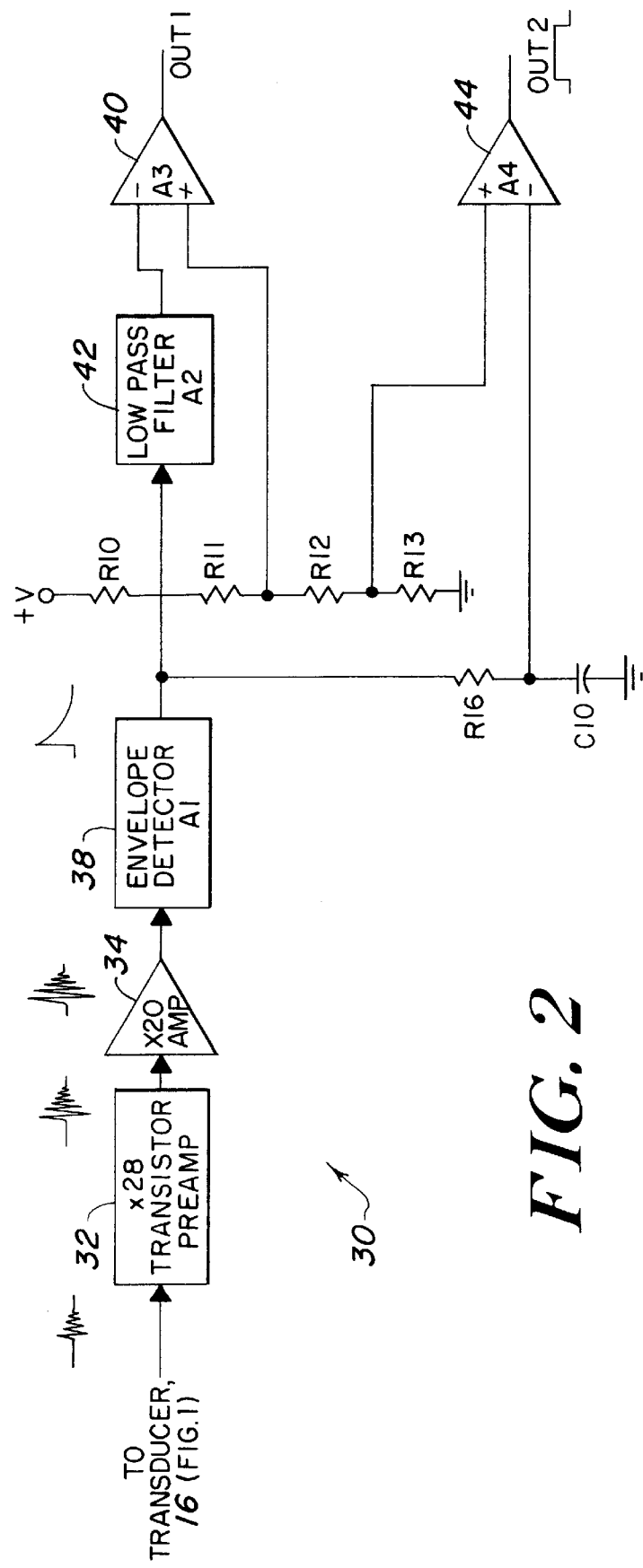
FIG. 2 is block diagram of the analog-to-digital signal discriminator of the impulse characteristic responsive missing object locator operable in noisy environments in accord with the present invention.
Figure 3:
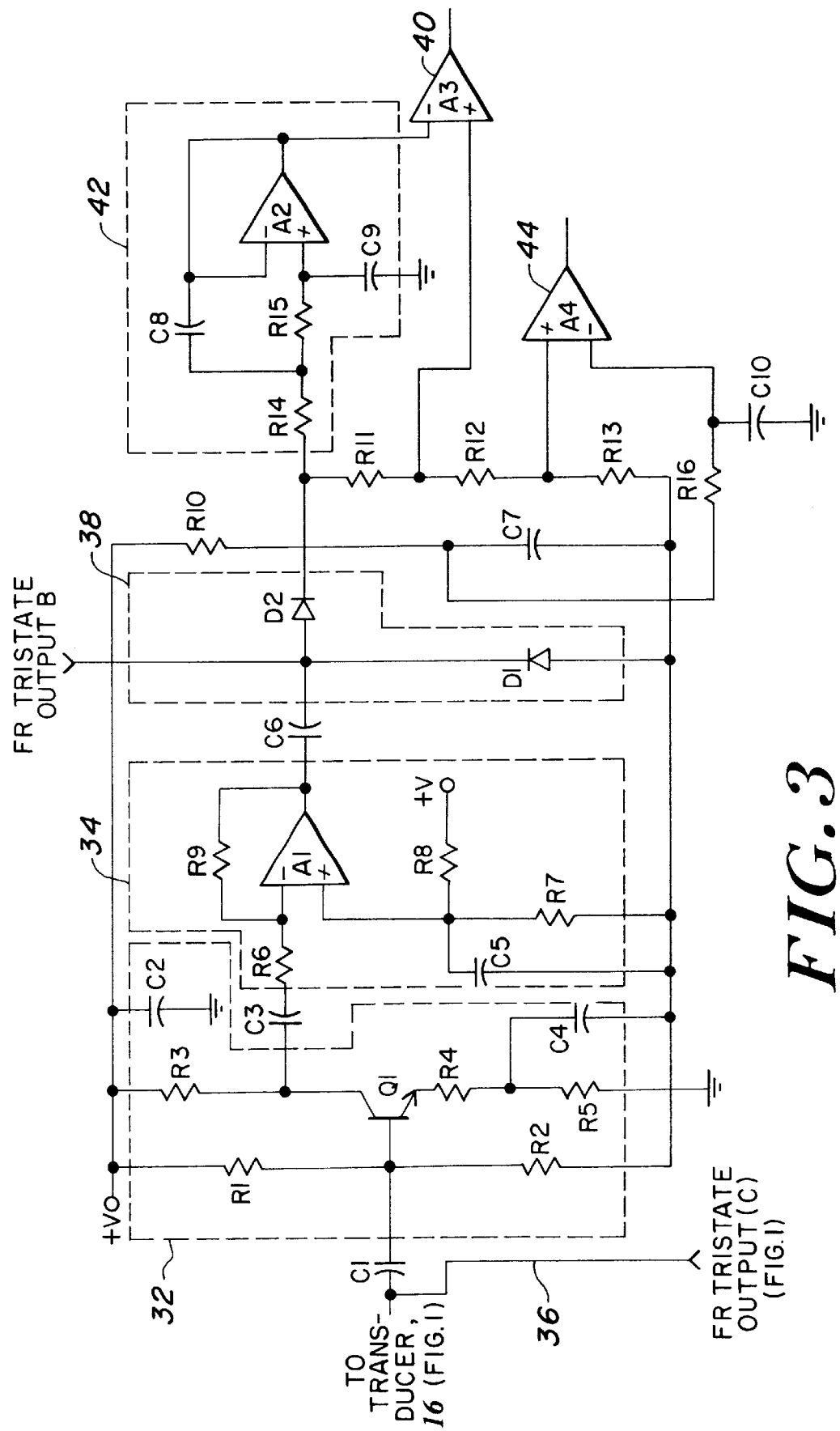
FIG. 3 is a circuit diagram of the analog-to-digital signal discriminator of the impulse characteristic responsive missing object locator operable in noisy environments in accord with the present invention.

Referring now to FIG. 2, generally designated at 30 is a block diagram of the analog-to-digital signal discriminator 12 (FIG. 1) of the impulse characteristic responsive missing object locator operable in noisy environments in accord with the present invention. The discriminator 30 includes an amplifier, constituted by transistor preamplifier stage 32 and by op-amp stage 34, connected to the transducer 16 (FIG. 1) and operative to amplify the triggering sounds produced thereby to a level useable by the remainder of the circuit. Although the amplifier is constituted by a transistor preamplifier stage 32 and by an op-amp stage 34, it will be appreciated that different amplifier circuits could be employed without departing from the inventive concepts. As shown in FIG. 3, the transistor preamplifier stage 32 preferably includes a transistor marked "Q1" whose base is connected via coupling capacitor marked "C1" to the transducer 16 (FIG. 1), whose collector is connected to the voltage rail marked "V" via the resistor marked "R3" and whose emitter is connected to circuit ground via the R/C network marked "R4,R5,C4." The base thereof is also connected to the voltage rail via resistor marked "R1" and to circuit ground via the resistor marked "R2." A decoupling capacitor marked "C2" is connected between the voltage rail and circuit ground to quiet the voltage rail. A line 36, connected between the transducer 16 (FIG. 1) and the coupling capacitor "C1," is connected to the normally floating tri-state output (C) of the digital detector 14 (FIG. 1). The resistors "R1–R5" set the operating point of the transistor "Q1" and the capacitor "C4" is provided to adjust the gain of the transistor "Q1." Amplifier stage 34 includes an op-amp marked "A1" connected with its inverting input to the collector of the transistor "Q1" via a series arrangement of a coupling capacitor marked "C3" and a resistor marked "R6," with its inverting input to circuit ground via an RC network comprised by resistor marked "R7" and capacitor marked "C5" in parallel, and connected with its output to its non-inverting input through feedback resistor marked "R9." A resistor marked "R8" is connected between the voltage rail and the parallel resistor "R7" and capacitor "C4." The feedback resistor "R9" and the resistor "R6" enable the gain of the amplifier stage 34 to be set, and the RC network of the resistors "R7, R8" and capacitor "C5" enable to set the quiescent op amp output voltage to the middle of the usable output voltage range for the op amp.

Returning now to FIG. 2, an envelope detector 38 is preferably connected to amplifier stage 34 to receive the amplified output signal thereof. The envelope detector 38 detects the envelope of the amplified analog signals output by the amplifier stage 34 and provides an envelope detector signal at its output whose magnitude corresponds to the amplitude of the input triggering sounds and whose slew rate corresponds to the attack rate of the input triggering sounds. As used herein, "slew rate" refers to the voltage velocity of the envelope detector signal. As shown in FIG. 3, envelope detector 38 is preferably comprised by a pair of back-to-back diodes marked "D1, D2," such as Germanium diodes, and capacitor "C7," although any other suitable envelope detector may be employed without departing from the inventive concepts. An AC coupling capacitor marked "C6" is connected between the amplifier stage 34 and the envelope detector 38.

Returning now again to FIG. 2, a comparator 40 having inverting and non-inverting inputs is connected with its inverting input to the envelope detector 38 to receive the envelope detector signal provided thereby via low pass filter 42 and is connected with its non-inverting input to the envelope detector 38 to receive the envelope detector signal provided thereby via resistor "R11" of resistor divider network comprised by the resistors marked "R10, R11, R12 and R13." The resistors "R10, R11" are provided (1) to maintain the inverting input of the comparator 40 "high," and thereby its output "low," when no sound is being detected and (2) to provide a preselected attenuation of the envelope detector signal by a first factor. The resistor "R10," it should be noted, is provided to swamp-out the input offset of the low pass filter 42 and comparator 40, so that the output of both comparators 40, 42 are "low" in the absence of input signal. The resistor "R12" is optional in one embodiment, but is preferably provided to allow different values to be selected for the first factor and for a second factor to be described. For the embodiments of the digital detector 14

(FIG. 1) described hereinbelow in connection with the description of the FIGS. 9–12 and the FIGS. 13–18, the comparator 40 is operated in "active low" mode; its normally "high" output goes "low" in the presence of a signal having the requisite impulse characteristics. The commercially-available HMC 73200 "chip," for example, supports operation in "active low" mode.

As appears more fully below, the low pass filter 42 provides no attenuation for slowly varying but high attenuation for envelope detector signals whose slew rates are rapidly varying. Whenever envelope detector signals are provided by the envelope detector 38 having slew rates that correspond to or are greater than the minimum attack rate of the expected impulse-like triggering sounds, the low pass filter 42 acts to slow down the rising edge of the envelope detector signal. For such expected impulse-like triggering sounds, the signal level on the inverting input of the comparator 40, that is less than the signal (which includes, as will be appreciated, the instantaneous ambient background noise level) appearing at its non-inverting input by the first factor, acts to toggle the comparator "high" for the brief time that the rising edge of the expected impulse-like triggering sounds is delayed by the low pass filter 42 and for so long as the amplitude thereof is less than the level of the attenuated signal at the non-inverting input thereof, whereby the comparator 40 provides its impulse-captured output signal "out1." But if the slew rate of the envelope detector signal is less than the minimum attack rate of the expected impulse-like triggering sounds (as would be provided by such impulse-like triggering sounds as speech or music), no differential delay is imparted thereby and the comparator 40 remains "low." Other techniques than the low pass filter 42 and comparator 40 to provide selectable rise time discrimination may be employed without departing from the inventive concepts.

As shown in FIG. 3, low pass filter 42 is preferably a second order low pass filter having op-amp marked "A2," feedback capacitor marked "C8" connected between its output and its non-inverting input via resistor marked "R15," capacitor marked "C9" connected between its non-inverting input and circuit ground, and its inverting input connected between its output and the capacitor "C8." In the presently preferred embodiment, the cut-off frequency of the second order low pass filter is two hundred and twenty (220) hertz. For an exemplary unitary signal voltage, the slew rate is one and thirty eight hundredths (1.38) volts per millisecond. For no attenuation, comparator 40 goes high for any signal whose slope (slew rate) exceeds one and thirty eight hundredths (1.38) volts per millisecond. If an attenuator is present, the minimum slew rate for triggering varies in inverse relation with the attenuation. In the presently preferred embodiment, the attenuation is selected to provide a minimum slew rate of one and eight-tenths (1.8) volts per millisecond. Any signal whose slope exceeds one and eight-tenths (1.8) volts per millisecond, or part of which exceeds one and eight-tenths (1.8) volts per millisecond, will make comparator 40 go high (or "low," if the HMC-73200 or equivalent is used) for the duration of that rapidly varying part of the signal. A typical close-by clap produces a signal of about one-half (0.5) to one (1) volts, with a rise time in the range of two-tenths (0.2) to one-half (0.5) milliseconds, approximately.

Returning now to FIG. 2, a comparator 44 having inverting and non-inverting inputs is connected with its inverting input to the envelope detector 38 to receive the envelope detector signal provided thereby via a R/C network consisting of a resistor marked "R16" and a capacitor marked "C10" in series, and is connected with its non-inverting input to the envelope detector 38 to receive the envelope detector signal provided thereby via resistor "R12" of resistor divider network comprised by the resistors "R10, R11, R12 and R13." The resistor "R12" provides a preselected attenuation of the envelope detector signal by a second factor. The time constant of the R/C network is selected to be larger than that of the low pass filter 42 so that it has a slower response, enabling the signal that appears thereat to slowly build and decay so as to represent the average background noise level. In the preferred embodiment, the time constant of the R/C network is selected to be about two and six-tenths (2.6) seconds, corresponding to a slew rate of eight-tenths (0.8) mv per ms for a two-to-one (2:1) attenuation (second factor), which distinguishes expected impulse-like triggering sounds from other sounds too slowly varying to be impulse-like. Such sounds may, for example, be hums or dins as provided by a car in motion (road noise), or in a home environment by an air conditioner or fan of a PC or a vacuum cleaner. In this manner, it distinguishes hand-claps, music and speech from non-impulse-like sounds.

The "R11, R12, R13" voltage divider establishes a threshold as a percentage of the current background sound level. The "R16, C10" R/C network has a slow response. Thus, the non-inverting input of the comparator 44 sees a more rapidly changing voltage than the inverting input thereof. Whenever envelope detector signals are provided by the envelope detector 38 having slew rates that correspond to or are less than the attack rates of the expected impulse-like triggering sounds (as opposed to non impulse-like triggering sounds, as described above), the R/C network acts to slow down the build-up of voltage thereacross (due to its high time constant) while the instantaneous voltage across "R12" corresponds to the attenuated voltage of the envelope detector signal. For such expected impulse-like triggering sounds, provided, and so long as, the instantaneous signal level on the non-inverting input of the comparator 44 is greater than the slowly-varying signal level appearing at its inverting input by the preselected attenuation provided by the resistor "R12," the comparator 44 goes "high," whereby the comparator 44 provides its impulse-captured and noise-rejected output signal "out2." But if either the slew rate of the envelope detector signal is less than the attack rate of the expected impulse-like triggering sounds (as opposed to non-impulse-like triggering sounds), or if the instantaneous voltage thereof is not large enough to overcome the attenuation level selected, the comparator 44 remains "low." As will be appreciated by those of skill in the art, this action provides a continuously variable threshold so that the circuit is not swamped at high background noise levels.

Output two (2) provides an indication of how long the current impulse-like signal remains louder than the average background noise. Critical here is that this threshold is not fixed, but is constantly being adjusted based on the environment in which it is being used. Basically, if a person claps in a noisy room, he or she will tend to clap louder than he or she would in a quiet room. On the one hand, false alarms are reduced by requiring that much louder a signal to trigger than with a fixed threshold, and, on the other hand, it does not respond to room noise, howsoever loud.

Figure 4A:
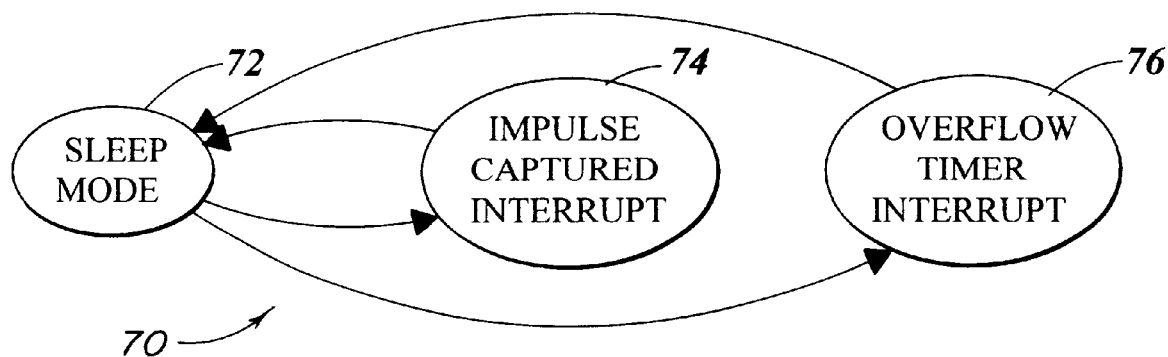
FIG. 4A is a flowchart of one embodiment of the digital detector illustrating the impulse-captured interrupt routine and overflow timer interrupt routine thereof and FIG. 4B is a pictorial diagram illustrating certain variables created or used by the impulse-captured interrupt routine and overflow timer interrupt routine of the digital detector of the impulse characteristic responsive missing object locator operable in noisy environments in accord with the present invention.

Referring now to FIG. 4, generally designated at 70 in the FIG. 4A thereof is a flowchart of one embodiment of the digital detector of the impulse characteristic responsive missing object locator operable in noisy environments in accord with the present invention. As shown by block 72, the digital detector nominally is in a low-power sleep mode where its hardware interrupt is enabled. Upon the occurrence of an impulse-captured signal (provided by the analog-to-digital discriminator operated in its "active high" mode in the manner described above), the processor thereof is awakened from its sleep mode, whereupon it calls an impulse-captured interrupt routine as shown by a block 74, and concurrently calls an overflow timer interrupt routine, as shown by a block 76.

As described more fully hereinbelow, the processor is operative during execution of the overflow timer interrupt routine to start an overflow timer 78 (FIG. 4B), which preferably overflows every four hundred (400) milliseconds, and to count a predetermined number of such overflows, preferably four (4), in an overflow counter 80. The overflow counter thereby is incremented in steps of four hundred (400) milliseconds, which is employed by the impulse-captured interrupt routine in a manner to be described to detect whether successive impulse-like triggering sounds occur in accord with the minimum repetition rate of expected impulse-like triggering sounds.

As appears more fully below, if another impulse-captured signal interrupt is not received by the processor within four (4) periods of four hundred (400) milliseconds each, the overflow timer interrupt routine is exited and the processor goes back to sleep mode. In this manner, the overflow counter sets the maximum repetition rate of expected impulse-like triggering sounds.

Figure 4B:
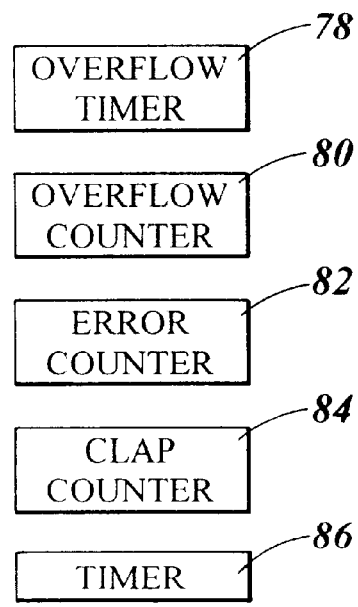

As described more fully hereinbelow, the processor is operative during execution of the impulse-captured interrupt routine 74 to call a pulse-validate subroutine to be described that detects whether the impulse-captured and impulse-captured and noise-rejected signals (provided by the analog-to-digital signal discriminator) are substantially simultaneous, which eliminates spurious conditions, and if they are not, increments an error counter 82 (FIG. 4B). If they are, the processor during execution of the pulse-validate subroutine detects whether the impulse-captured and noise-rejected signal has a duration that corresponds to or is greater than the minimum duration of expected impulse-like triggering sounds, forty (40) milliseconds in the preferred embodiment, and if is, increments a clap counter 84 (FIG. 4B). A timer 86 (FIG. 4B) that times actual elapsed time is employed for this purpose in a manner to be described. Otherwise, the error counter 82 is incremented. In either event, processing then returns to the impulse-captured interrupt routine.

As appears more fully below, the processor during execution of the impulse-captured interrupt routine then determines whether the requisite number of "valid" impulse-captured signal interrupts has been detected, and if not, detects whether successive impulse-captured signal interrupts exhibit the requisite minimum repetition rate (using the overflow counter 80) and counts an error in the error counter 82 if not. If the requisite number of valid impulse-captured signal interrupts have been detected, the processor during operation in the impulse-captured interrupt routine determines if too many errors have been counted. In the preferred embodiment, three (3) is the error threshold, although a different error threshold could be employed without departing from the inventive concepts. If the errors are below the error threshold, the processor is operative to call an alert subroutine to be described that provides the audible alert while disabling the analog-to-digital signal discriminator while the audible alert is being sounded.

Figure 5:
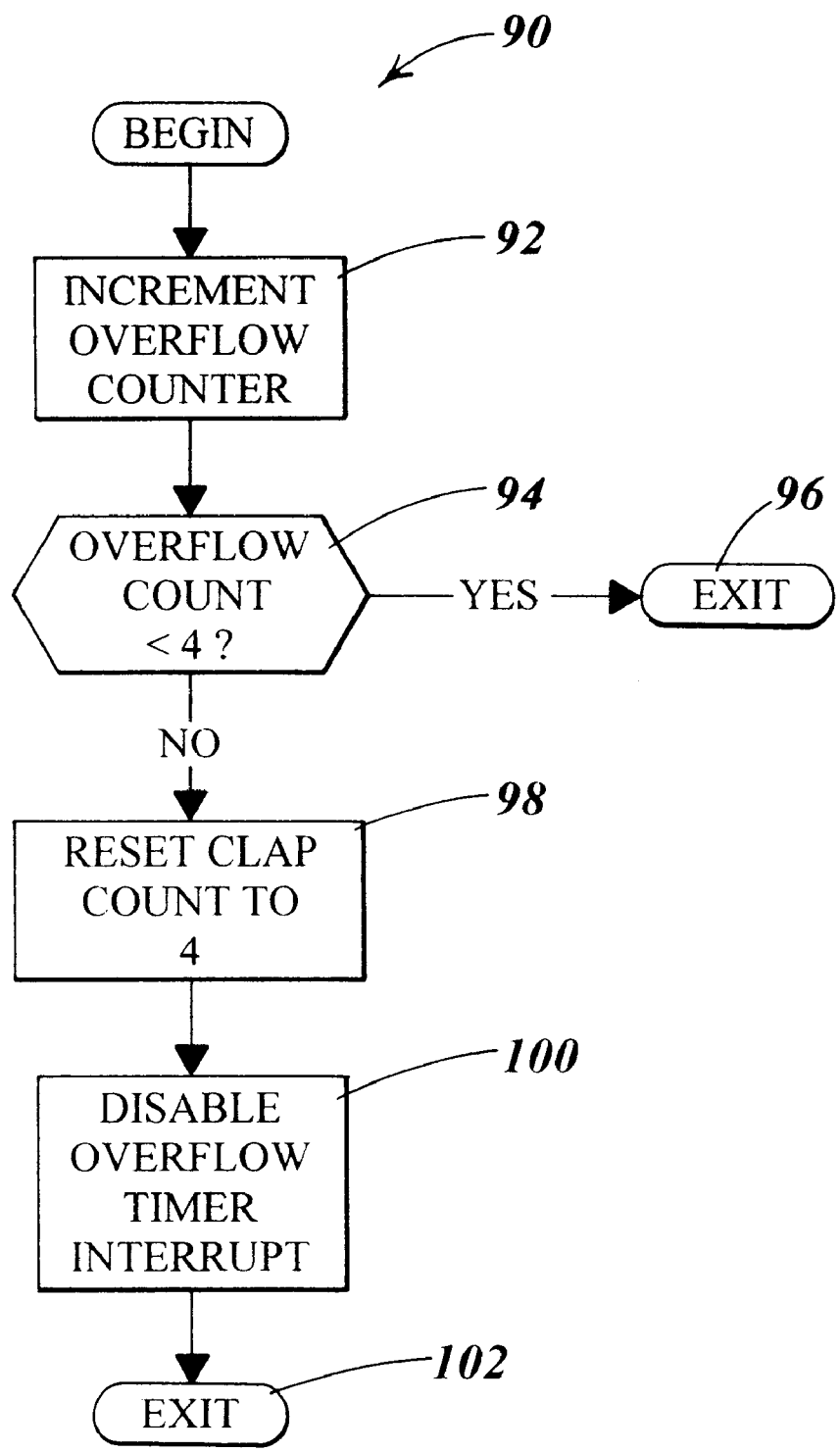
FIG. 5 is a flowchart of the overflow timer interrupt routine of the digital detector of the FIG. 4A of the impulse characteristic responsive missing object locator operable in noisy environments in accord with the present invention.

Referring now to FIG. 5, generally designated at 90 is a flow chart illustrating the overflow timer interrupt routine of the digital detector of the impulse characteristic responsive missing object locator operable in noisy environments in accord with the present invention. As shown by a block 92, upon receipt of an interrupt at its interrupt port, the processor increments the overflow counter.

As shown by a block 94, the processor then determines whether the count in the overflow counter is less than four (4), and, if it is, the overflow timer interrupt routine is exited as shown by a block 96.

As shown by a block 98, if the overflow counter is not less than four (4), then too much time than that permitted by the maximum pulse repetition rate has elapsed since the last impulse-captured signal interrupt and the clap counter is reset to four (4). The clap counter is decremented in the presently preferred embodiment. As shown by a block 100, the processor then disables the overflow timer interrupt and exits the routine as shown by a block 102.

Figure 6:
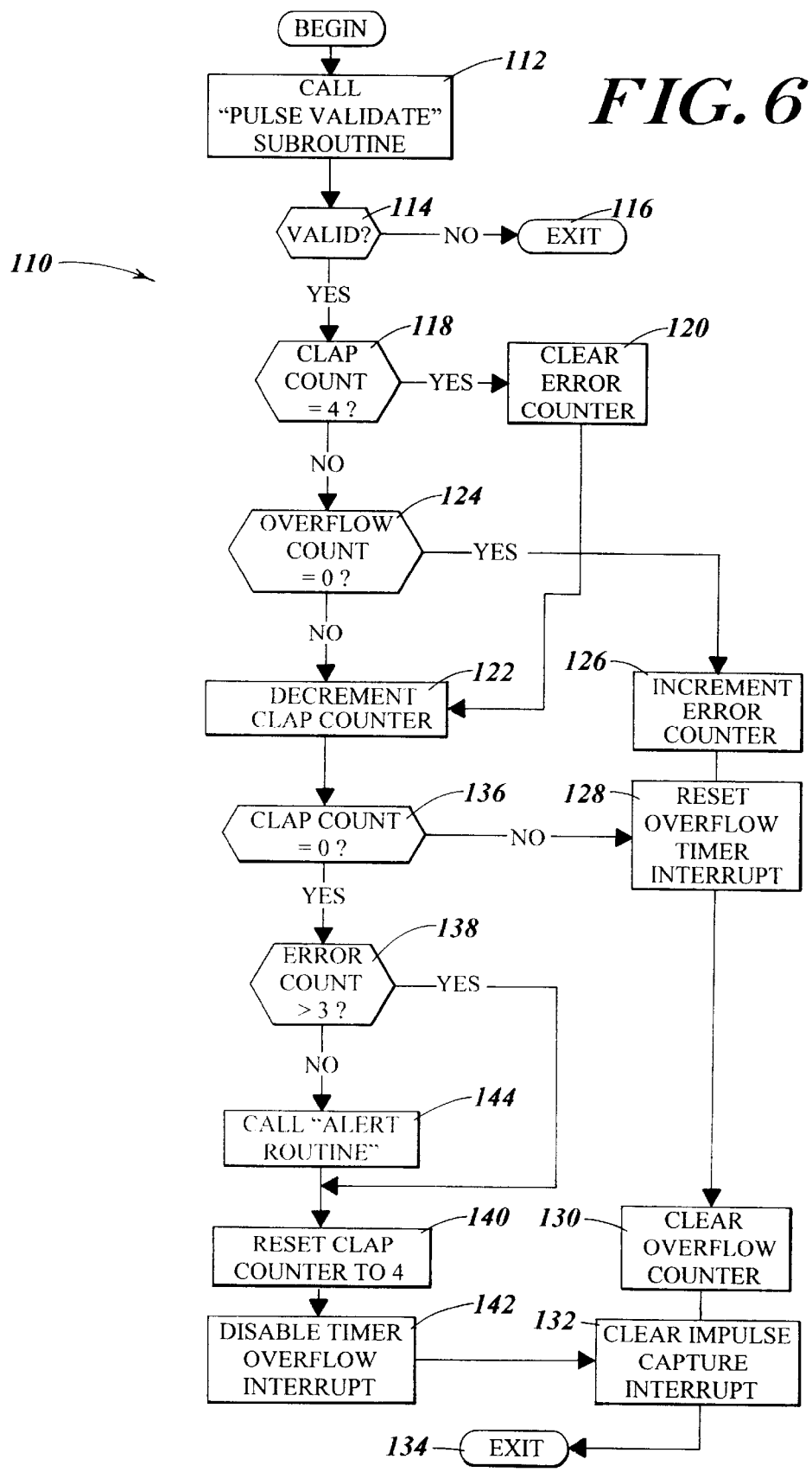
FIG. 6 is a flowchart of the impulse-captured interrupt routine of the digital detector of the FIG. 4A of the impulse characteristic responsive missing object locator operable in noisy environments in accord with the present invention.

Referring now to FIG. 6, generally designated at 110 is a flow chart illustrating the impulse-captured interrupt routine of the digital detector of the impulse characteristic responsive missing object locator operable in noisy environments in accord with the present invention.

As shown by a block 112, the processor is operative to call the "pulse-validate" subroutine described below in connection with the description of FIG. 7.

Figure 7:
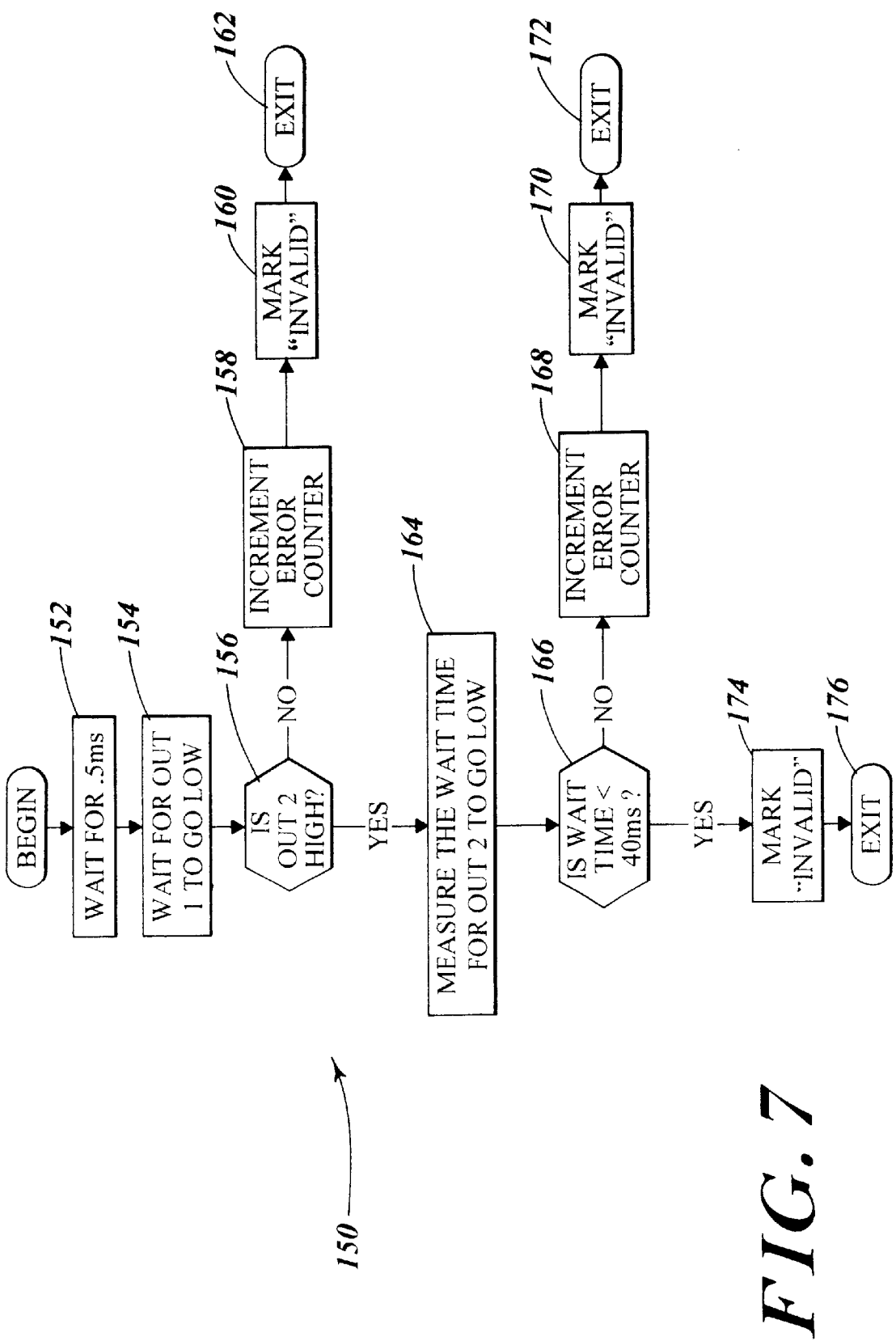
FIG. 7 is a flowchart of the pulse-validate subroutine called by the impulse-captured interrupt routine of the FIG. 6 of the impulse characteristic responsive missing object locator operable in noisy environments in accord with the present invention.

Referring now briefly to FIG. 7, generally designated at 150 is a flow chart illustrating the pulse-validate subroutine of impulse-captured interrupt routine of the digital detector of the impulse characteristic responsive missing object locator operable in noisy environments in accord with the present invention.

As shown by a block 152, the processor is operative to wait for five-tenths (0.5) milliseconds to allow the inputs to "settle."

As shown by block 154, the processor then waits for the impulse-captured signal (out1) to go low.

As shown by a block 156, the processor is then operative to ask if the impulse-captured and noise-rejected signal (out2) is high when the impulse-captured signal (out1) went low. If not, the error counter 82 (FIG. 4B) is incremented as shown by a block 158, the impulse-captured signal interrupt is marked "invalid" as shown by a block 160, and processing exits the subroutine as shown by a block 162.

If the impulse-captured and noise-rejected signal (out2) is high, the processor is operative to measure the wait time (using the timer 86 (FIG. 4B)) for the impulse-captured and noise-rejected signal (out2) to go low as shown by a block 164.

As shown by a block 166, the processor is then operative to determine whether the wait time is less than forty (40) milliseconds. If it is, the processor is operative to increment the error counter as shown by a block 168, to mark the impulse-captured signal interrupt "invalid" as shown by a block 170 and to exit the subroutine as shown by a block 172. In an alternative embodiment, it may be marked "valid" while incrementing the error counter. Even if any of the impulse-captured signal interrupts lasts less than forty (40) milliseconds, it still gets counted as "valid," which may be useful where one of the triggering sounds is too weak.

If the wait time was not less than forty (40) milliseconds, the processor is operative to mark the impulse-captured signal interrupt "valid" as shown by a block 174 and the subroutine is exited as shown by a block 176.

Returning now to FIG. 6, as shown by a block 114, if the pulse-validate subroutine does not return as "valid," the impulse-captured interrupt subroutine is exited as shown by a block 116. If the return is "valid," then the processor is operative to determine whether the clap count is equal to four (4) as shown by a block 118. If it is, the processor is operative to clear the error counter as shown by a block 120 and to decrement the clap counter as shown by a block 122. This results in a clap being counted.

If the clap count is not equal to four (4), the processor is operative to determine whether the overflow counter is equal to (0) zero as shown by a block 124.

If the overflow counter equals zero (0), then the error counter is incremented as shown by a block 126, the overflow timer interrupt is reset as shown by a block 128, the overflow timer is reset as shown by a block 130, the impulse-captured signal interrupt is cleared as shown by a block 132 and the impulse-captured interrupt routine is exited as shown by a block 134.

As shown by the block 122, if the overflow counter does not equal zero (0), the clap counter is decremented to record a clap.

As shown by block 136, the processor is then operative to determine whether the expected number of claps has been received by asking whether the clap count is equal to zero (0).

If the expected number of impulse-like triggering sounds has yet to be counted, the processor is operative to exit the impulse-captured interrupt routine as shown by the blocks 128, 130, 132 and 134.

If the clap count equals zero (0), the processor is operative to determine whether the count in the error counter is greater than three (3) as shown by a block 138. If it is, the processor is operative to reset the clap counter to four (4) as shown by a block 140, to disable the timer overflow interrupt as shown by a block 142 and to exit the impulse-captured interrupt routine as shown by the blocks 132 and 134.

If the error count was not less than three (3), the "alert" subroutine is called as shown by a block 144. The alert subroutine is described in connection with the description of FIG. 8.

Figure 8:
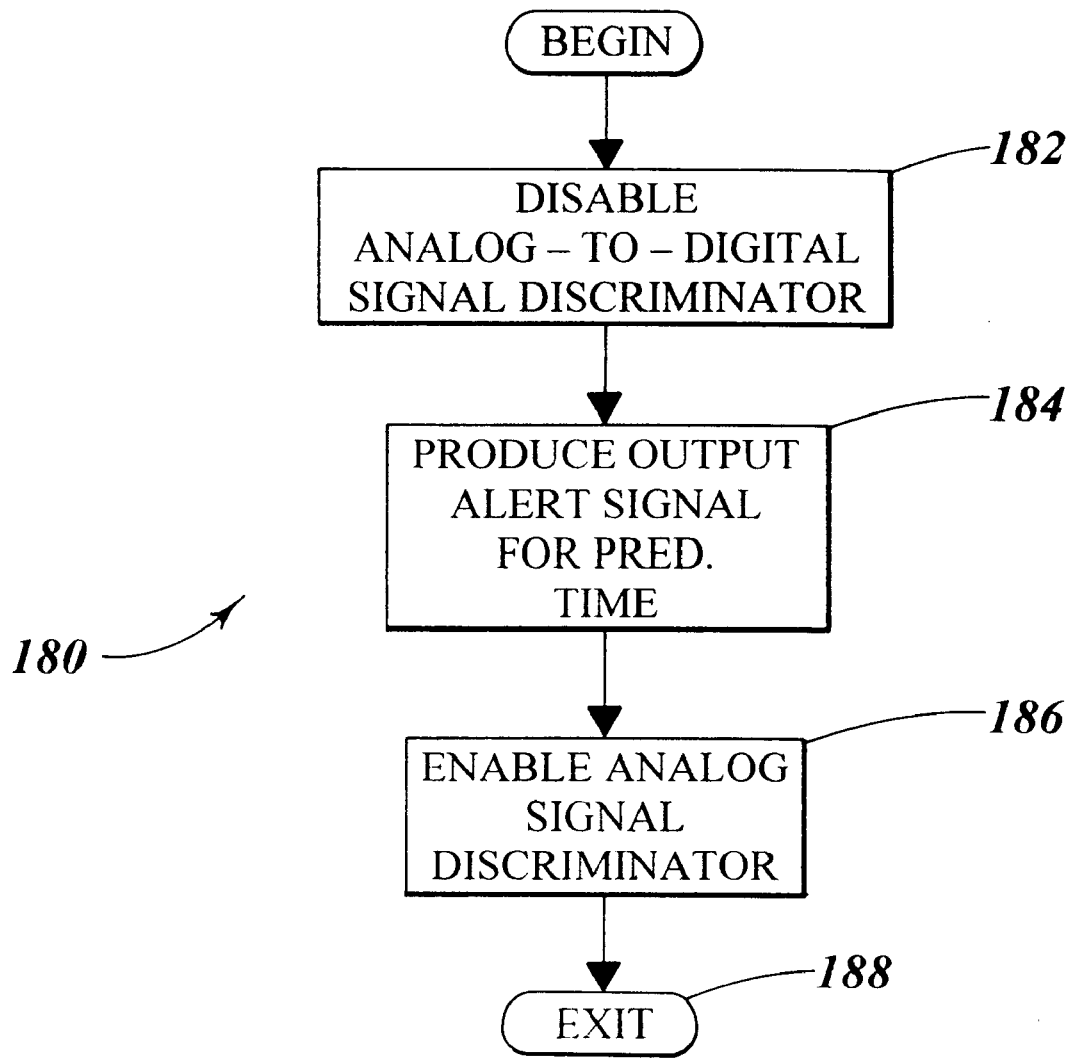
FIG. 8 is a flowchart of the alert-subroutine called by the impulse-captured interrupt routine of the FIG. 6 of the impulse characteristic responsive missing object locator operable in noisy environments in accord with the present invention.

Referring now briefly to FIG. 8, generally designated at 180 is a flow chart of the alert subroutine of the impulse-captured interrupt routine of the digital detector of the impulse characteristic responsive missing object locator operable in noisy environments in accord with the present invention.

As shown by a block 182, the processor is operative to disable the analog-to-digital signal discriminator.

As shown by a block 184, the processor is then operative to produce the output alert signal for a predetermined time.

As shown by a block 186, the processor is then operative to enable the analog-to-digital signal discriminator and processing exits the subroutine as shown by a block 188.

Returning now to FIG. 6, after returning from the alert subroutine, the processor is operative to reset the clap counter as shown by the block 140, to disable the timer overflow interrupt as shown by a block 138, and to exit the routine as shown by the blocks 132, 134. It is then back again in its sleep mode.

Figure 9A:
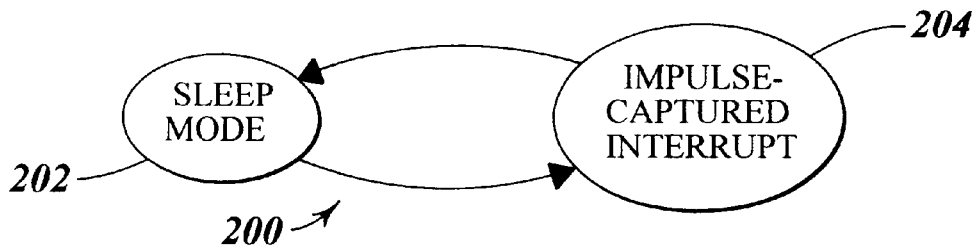
FIG. 9A is a flowchart of another embodiment of the digital detector illustrating the impulse-captured interrupt routine thereof and FIG. 9B is a pictorial diagram illustrating certain variables created or used by the impulse-captured interrupt routine of the digital detector of the impulse characteristic responsive missing object locator operable in noisy environments in accord with the present invention.
Figure 9B:
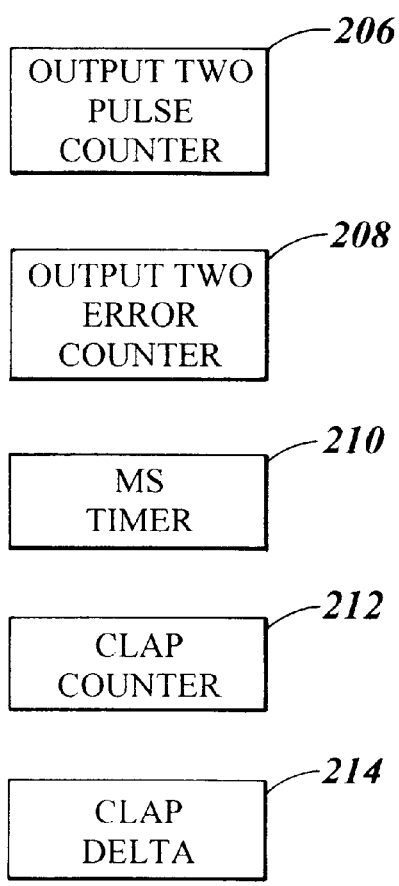

Referring now to FIGS. 9a and 9b, generally designated at 200 in the FIG. 9A thereof is a flowchart of another embodiment of the digital detector of the impulse characteristic responsive missing object locator operable in noisy environments in accord with the present invention. As shown by block 202, the digital detector nominally is in a low-power sleep mode where its hardware interrupt is enabled. Upon the occurrence of the falling edge of an impulse-captured signal (provided by the analog-to-digital discriminator operated in its "active low" mode in the manner described above), the processor thereof is awakened from its sleep mode, whereupon it calls an impulse-captured interrupt routine as shown by a block 204.

As described more fully hereinbelow, the processor is operative during execution of the impulse-captured interrupt routine 204 to clear an output two pulse counter 206 (FIG. 9B), which is incremented on every rising edge of the output two signal. The output two pulse counter keeps track of every output two signal during a potential actuation sequence.

The processor is operative during execution of the impulse-captured interrupt routine 204 to call a pulse-validate subroutine to be described that confirms whether the impulse-captured and impulse-captured and noise-rejected signals (provided by the analog-to-digital signal discriminator) are substantially simultaneous, which eliminates spurious conditions, and to detect whether the impulse-captured and noise-rejected signal has a duration that corresponds to that of expected impulse-like triggering sounds, between sixty (60) and two hundred fifty (250) milliseconds in the preferred embodiment, and if it is out of these bounds, controllably increments an output two error counter 208 (FIG. 9B), while if it is within bound, increments the clap counter 212 (FIG. 9b). A ms timer 210 (FIG. 9B) is employed for this purpose in a manner to be described.

The minimum expected duration of the output two signal is selected to distinguish expected impulse-like hand claps from lower-energy impulses, like movement of fabric against the unit in the pants or the wrestling motion thereof in a pocket book, while the maximum expected duration thereof enables to distinguish expected acoustically-arising hand claps from higher-energy impulses such as mechanical shock energy that may arise if the device were dropped. In the preferred embodiment, the former event increments the error counter by one (1) unit, while the latter event increments it by three (3) units, although any other controlled increments may be employed without departing from the inventive concepts.

As appears more fully below, the processor during execution of the impulse-captured interrupt routine then determines whether too many output two errors have been counted, and if too many errors have been counted, it goes back to sleep mode. If not, it loads the value of the clap counter 212 and determines whether its value is less than four (4). If it is, an interclap pause validate subroutine to be described is called, which, provided the first and second impulse captured signals of a possible actuation sequence fall within the expected minimum and maximum repetition rates, preferably four hundred (400) and sixteen hundred (1600) milliseconds, stores the interclap pause interval actually set by each particular user in a clap-delta register 214 (FIG. 9B) and otherwise checks the impulse-captured signals later than the first two thereof of a potential actuation sequence to determine if they fall within clap-delta plus or minus a tolerance. If outside the maximum or minimum repetitions rates, or if outside the tolerance of clap-delta, either pause-timeout is set or the processor returns to sleep mode.

If the output two errors counted are less than a threshold and if the requisite number of impulse-captured signals have been counted, the processor during operation in the impulse-captured interrupt routine determines if too many output two signals have been counted in the output two pulse counter.

In the preferred embodiment, five (5) is the threshold, one (1) more than the four (4) claps of the expected sequence of hand claps, although a different threshold could be employed without departing from the inventive concepts. If the number of output two pulses counted are below the threshold, the processor is operative to call the alert subroutine described above in connection with the FIG. 8 that provides the audible alert while disabling the analog-to-digital signal discriminator while the audible alert is being sounded; otherwise, the processor goes back into sleep mode.

Figure 10:
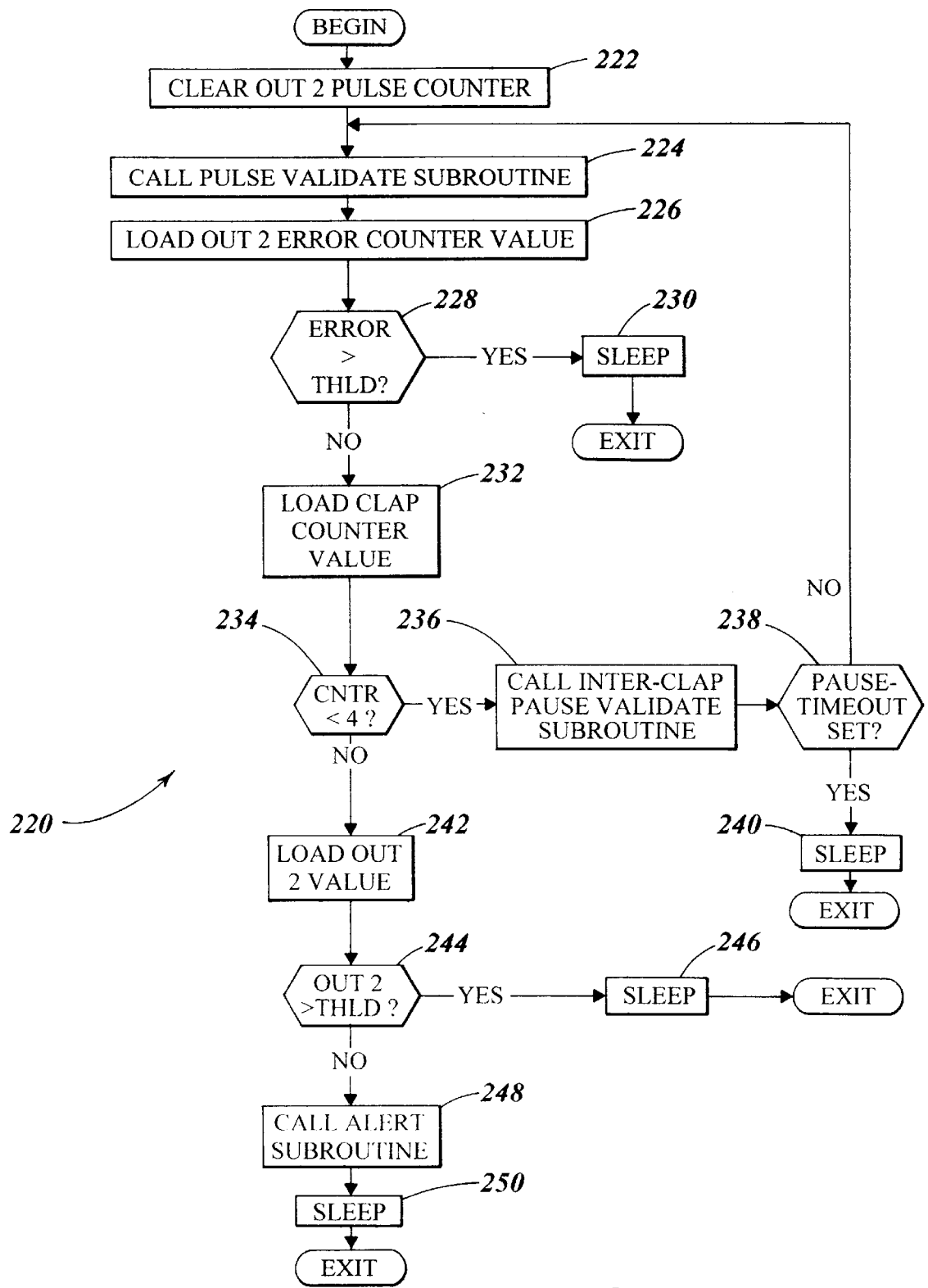
FIG. 10 is a flowchart of the impulse-captured interrupt routine of the digital detector of the FIG. 9A of the impulse characteristic responsive missing object locator operable in noisy environments in accord with the present invention.

Referring now to FIG. 10, generally designated at 220 is a flowchart of the digital detector illustrating the impulse-captured interrupt routine thereof. As shown by a block 222, the processor is operative upon receipt of a first impulse captured signal of a potential actuation sequence to clear the output two hardware pulse counter 206 (FIG. 9B), and as shown by a block 224, is operative to call the pulse validate subroutine.

Figure 11:
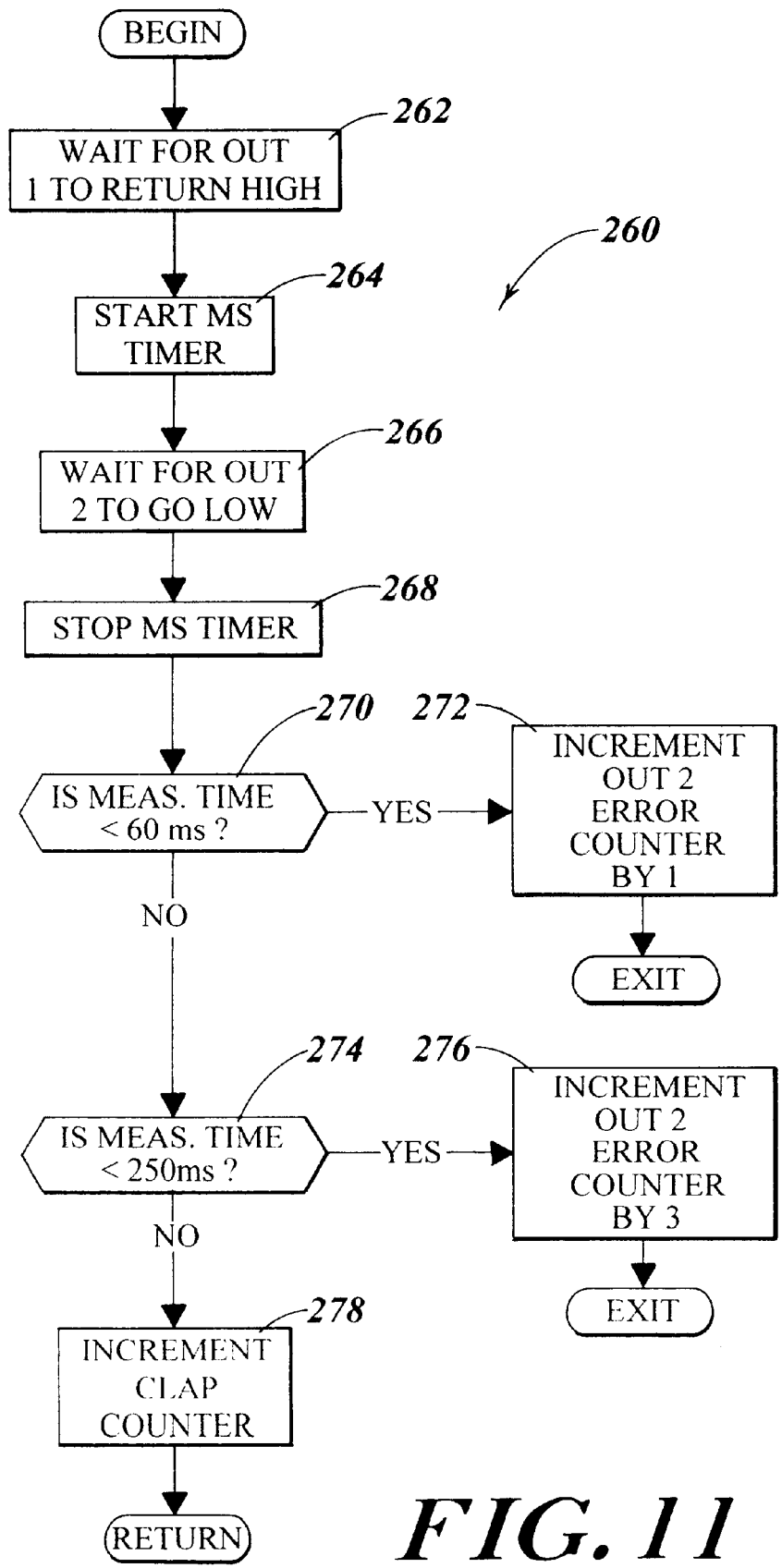
FIG. 11 is a flowchart of the pulse-validate subroutine called by the impulse-captured interrupt routine of the FIG. 10 of the impulse characteristic responsive missing object locator operable in noisy environments in accord with the present invention.

Referring now briefly to FIG. 11, generally designated at 260 is a flowchart of the pulse validate subroutine. As shown by a block 262, the processor waits until the impulse-captured signal returns "high," from its "active low" mode.

As shown by a block 264, the processor then starts the millisecond timer 210 (FIG. 9B), waits for the impulse-captured and noise rejected signal to go low as shown by the block 266 and thereupon stops the millisecond timer 210 (FIG. 9B).

As shown by a block 270, the processor then determines whether the measured time is less than the minimum expected dwell time for genuine hand claps, preferably sixty (60) milliseconds, and increments the output two error counter 208 (FIG. 9B) by one (1) unit if it is and processing returns to the impulse-captured interrupt routine. Otherwise, as shown by a block 274, the processor then determines whether the measured time is greater than the maximum expected dwell time for genuine hand claps, preferably two hundred fifty (250) milliseconds, and increments the output two error counter 208 (FIG. 9B) by three (3) units if it is and processing returns to the impulse-captured interrupt routine. Otherwise, as shown by a block 278, the processor then increments the clap counter 212 (FIG. 9B) and processing returns to the impulse-captured interrupt routine.

Returning now to FIG. 10, the processor then loads the output two error counter value as shown by a block 226 and determines whether the error count is greater than a threshold of three (3) as shown by a block 228. If it is as shown by a block 230 the processor returns to sleep mode and otherwise as shown by the block 232 the processor loads the clap counter value.

As shown by a block 234, the processor then determines whether the counter value is less than four (4). If it is less than four (4), the processor is operative to call the inter-clap pause validate subroutine as shown by a block 236.

Figure 12:
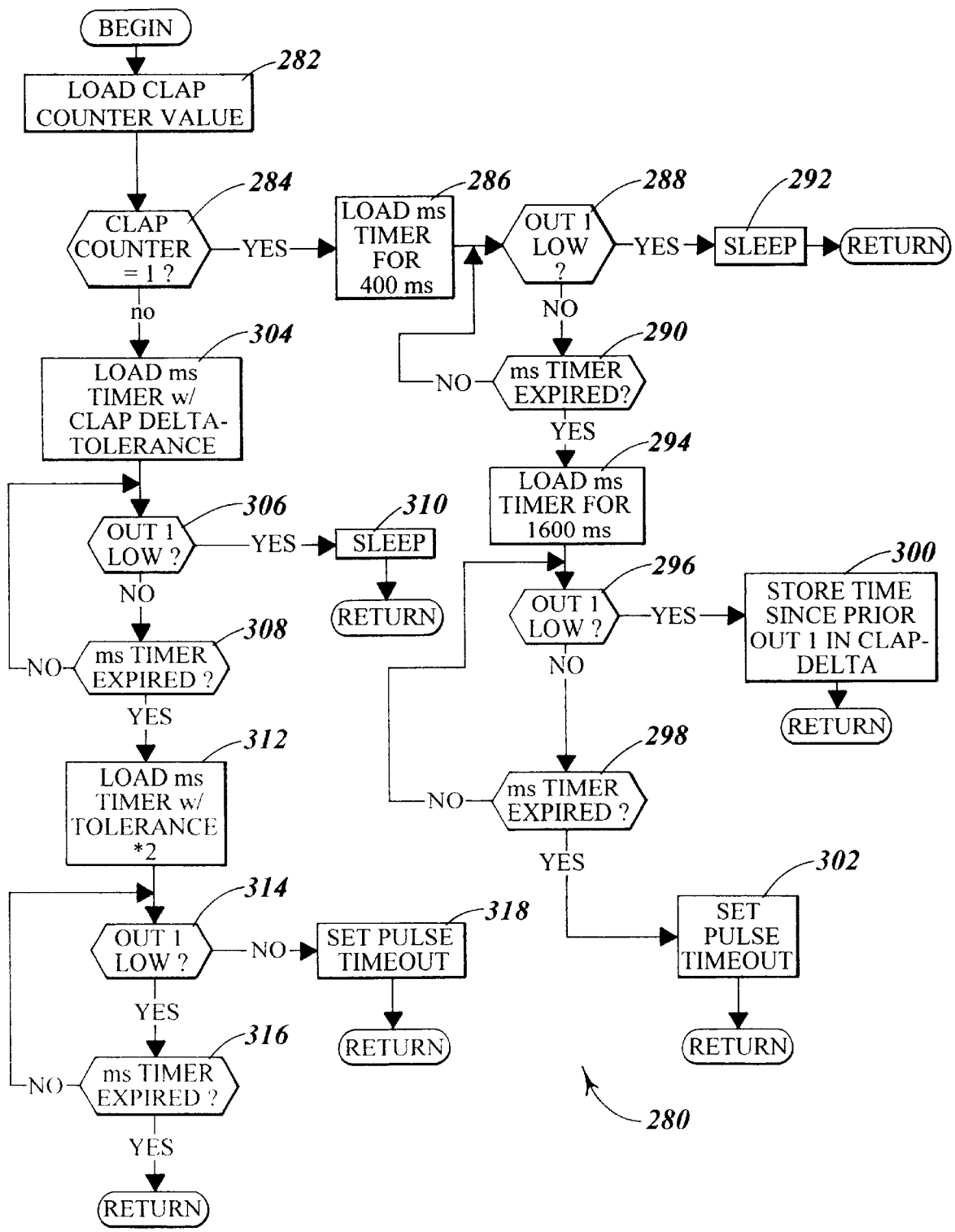
FIG. 12 is a flowchart of the interclap pause-validate subroutine called by the impulse-captured interrupt routine of the FIG. 10 of the impulse characteristic responsive missing object locator operable in noisy environments in accord with the present invention.

Referring now briefly to FIG. 12, generally designated at 280 is a flowchart of the inter-clap pause validate subroutine. As shown by a block 282, the processor is operative to load the value of the clap counter 212 (FIG. 9B) and as shown by the block 284 to determine if that value is one (1).

If it is and as shown by a block 286, the processor is operative to load the ms timer 210 (FIG. 9B) for four hundred (400) milliseconds. As shown by the blocks 288, 290, if the impulse-captured signal goes low within that minimum period the processor goes into sleep mode as shown by block 292 and processing returns to the impulse-captured routine; otherwise, the ms timer 210 (FIG. 9B) is loaded for sixteen hundred (1600) milliseconds as shown by a block 294.

As shown by the blocks 296, 298, if the impulse-captured signal goes low within that maximum period the processor then stores the time since the last impulse-captured signal in the clap-delta register 214 (FIG. 9B) as shown by the block 300 and processing returns to the impulse-captured routine; otherwise, pause-timeout is set as shown by the block 302 and processing returns to the impulse-captured routine. The actual time between the prior and the present output one pulses is equal to four hundred (400) milliseconds, plus the actual length of output two, plus whatever of the allowable sixteen hundred (1600) milliseconds has elapsed.

As shown by a block 304, if the value of the clap counter 212 (FIG. 9B) is not equal to one (1), the processor loads the ms timer 210 (FIG. 9B) with the value of the clap-delta register 214 (FIG. 9B) minus some tolerance, preferably two hundred (200) milliseconds, and as shown by the blocks 306, 308, the processor determines whether the impulse-captured signal goes low within clap-delta minus the tolerance. If it does, the processor goes into sleep mode as shown by block 310 and processing returns to the impulse-captured routine; otherwise, and as shown by a block 312, the processor is operative to load the ms timer 210 (FIG. 9B) with the value of twice the tolerance, preferably four hundred (400) milliseconds, and as shown by the blocks 314, 316, the processor determines whether the impulse-captured signal goes low within twice the tolerance. If it does, the processor sets pause-timeout as shown by a block 318; otherwise, processing returns to the impulse-captured routine.

Returning now to FIG. 10, and as shown by the block 234 thereof, if the value of the pulse counter 212 (FIG. 9B) is not less than four (4), the processor is operative to load the value of the output two pulse counter 206 (FIG. 9B) as shown by a block 242.

As shown by a block 244, if the value of the pulse counter 206 (FIG. 9B) is greater than an error threshold, preferably five (5), the processor goes into sleep mode as shown by the block 246; otherwise, and as shown by the block 248, the alert subroutine is called. The alert subroutine is the same as that described above in connection with the description of the FIG. 8 and is not again separately described herein.

As shown by the block 250, after the alert is sounded, the processor returns to sleep mode.

Figure 13A:
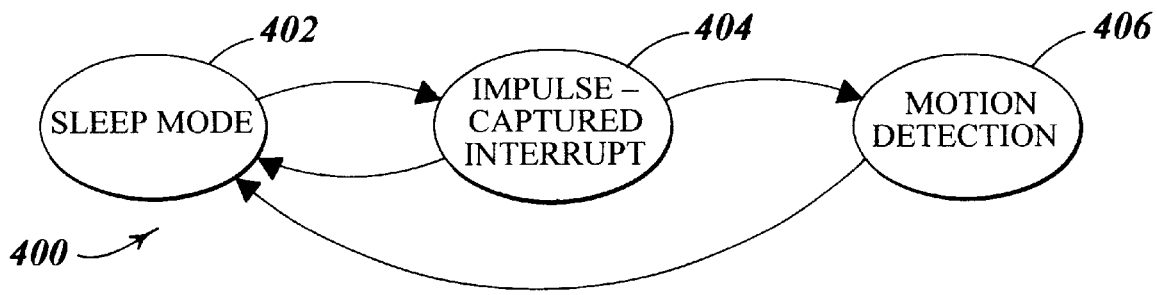
FIG. 13A is a flowchart of another embodiment of the digital detector illustrating the impulse-captured interrupt routine thereof and FIG. 13B is a pictorial diagram illustrating certain variables created or used by the impulse-captured interrupt routine of the digital detector of the impulse characteristic responsive missing object locator operable in noisy environments in accord with the present invention.
Figure 13B:
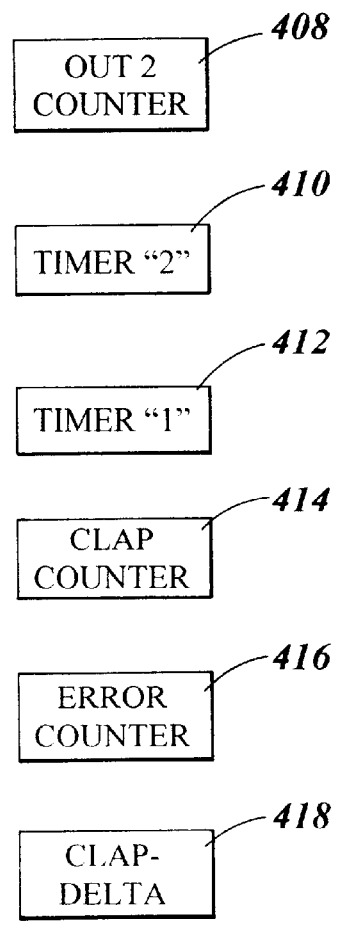

Referring now to FIG. 13*a* and 13*b*, generally designated at 400 in the FIG. 13*a* thereof is a flowchart of another embodiment of the digital detector of the impulse characteristic responsive missing object locator operable in noisy environments in accord with the present invention. As shown by block 402, the digital detector nominally is in low-power sleep mode where its hardware interrupt is enabled. Initially, upon startup, and subsequently, upon return, error, clap and other counters and registers to be described are reset and/or cleared in sleep mode. Upon the occurrence of an impulse-captured signal (provided by the analog-to-digital discriminator operated in its "active low" mode in the manner described above), the processor thereof is awakened from its sleep mode, whereupon it calls an impulse-captured interrupt routine as shown by a block 404.

The processor is operative during execution of the impulse-captured interrupt routine 404 to increment an output two pulse counter 408 (FIG. 13B), which is incremented on every rising edge of the output two signal. The output two pulse counter keeps track of every output two signal during a potential actuation sequence. The processor is operative during execution of the impulse-captured interrupt routine 404 to call a pulse-validate subroutine to be described that confirms whether the impulse-captured and impulse-captured and noise-rejected signals (provided by the analog-to-digital signal discriminator) are substantially simultaneous, which eliminates spurious conditions. A millisecond timer "2" 410 (FIG. 13B) is used for this purpose. If they are not, the processor calls a motion detection routine 406 to be described. If they are, the processor is operative to detect whether the impulse-captured and noise-rejected signal has a duration that corresponds to that of expected impulse-like triggering sounds, between forty (40) and one hundred twenty-five (125) milliseconds in the preferred embodiment, using a milliseconds timer "1" 412 (FIG. 13B) for this purpose, and if it is, increments a clap counter 414 (FIG. 13B). If not within bounds, the processor is operative to increment the clap counter 414 and to count an error if the measured duration is less than forty (40) milliseconds, to count an error if the measured duration is greater than forty (40) but less than sixty (60) milliseconds, to decrement the error count if the measured duration is greater than one hundred twenty-five (125) milliseconds but less than two hundred fifty (250) milliseconds if an error has already been counted, and to count an error if the measured duration is greater than two hundred fifty (250) milliseconds. An error counter 416 (FIG. 13B) is used for this purpose. The error count is preferably incremented by two (2) counts for the former event, by one (1) count for the antepenultimate event, is decremented by one (1) count for the penultimate event, and is incremented by three (3) counts for the latter event.

Like the embodiment of FIGS. 9–12 described above, the counting of claps together with the weighted counting of errors adapts detection to the characteristics of received triggering sounds and helps to prevent false alarm actuation. The predetermined times and error weights have been derived from histogram analysis of different environmental sound patterns, and have been found to maximize false alarm rejection while preserving detection sensitivity.

As appears more fully below, the processor during execution of the impulse-captured interrupt routine then determines whether too many output two errors have been counted, and if too many errors have been counted, goes back to sleep mode. If not, it loads the value of the clap counter 414 and determines whether its value is less than four (4). If it is, an interclap pause validate subroutine to be described is called, which, provided the first and second impulse-captured signals of a possible actuation sequence fall within the expected minimum and maximum repetition rates, preferably five hundred (500) and one thousand five hundred (1500) milliseconds, stores the inter-clap pause interval actually set by each particular user in a clap-delta register 418 (FIG. 13B), and otherwise checks the impulse-captured signals later than the first two thereof of a potential actuation sequence to determine if they fall within clap-delta plus or minus a tolerance. The millisecond timer "2" 410 (FIG. 13B) is used for this purpose. If less than the minimum repetition rates for the first clap or less than clap-delta tolerance for subsequent claps, the processor enters motion detection mode 406. But if they fall outside the maximum repetition rates or the tolerance of clap-delta, a pause timeout flag is set and the processor returns to sleep mode.

If the output two errors counted are less than the threshold, if the requisite number of impulse-captured signals have been counted, and if no pulse is received within clap-delta tolerance timeout (the "virtual" pulse), the processor during operation in the impulse-captured mode determines if too many output two signals have been counted in the output two counter 408 (FIG. 13B). In the preferred embodiment, five (5) is the threshold, one (1) more than the four (4) claps of the expected sequence of claps, although a different threshold and expected count could be employed without departing from the inventive concepts. If the number of output two pulses counted is below the threshold, the processor is operative to call the alert subroutine described above in connection with the FIG. 8 that provides the audible alert while disabling the analog-to-digital signal discriminator while the audible alert is being sounded, and thereafter goes back to sleep mode 402.

But if a "virtual" pulse is detected within clap-delta tolerance, the processor goes back to sleep mode. In this matter, the false alarm rejection rate of a longer intended actuation sequence is obtained without having the user actually employ that sequence.

The processor is operative in motion detection mode 406 to confirm a motion detection situation, preferably by requiring at least two (2) output two signals to be received within a predetermined time period, preferably one thousand (1000) milliseconds, although a different motion verification threshold and window could be employed. If not, it goes back to sleep mode 402; but if another output two signal is received, the processor is operative to set a count-down timer, preferably a six thousand (6000) milliseconds count-down timer, and to reset it every time another output two pulse is detected within the remaining time of the count-down timer. Processing thus adapts itself to the actual noise environment and remains within the motion detection state 406 for an indefinite time, unless and until no output two pulse is received within the predetermined time of the count-down timer, indicating a period of quiescence, whereupon it returns to sleep mode.

In an alternative embodiment, the detector of the invention goes into battery-conserving low-power mode for the duration of the indefinite time.

Figure 14A:
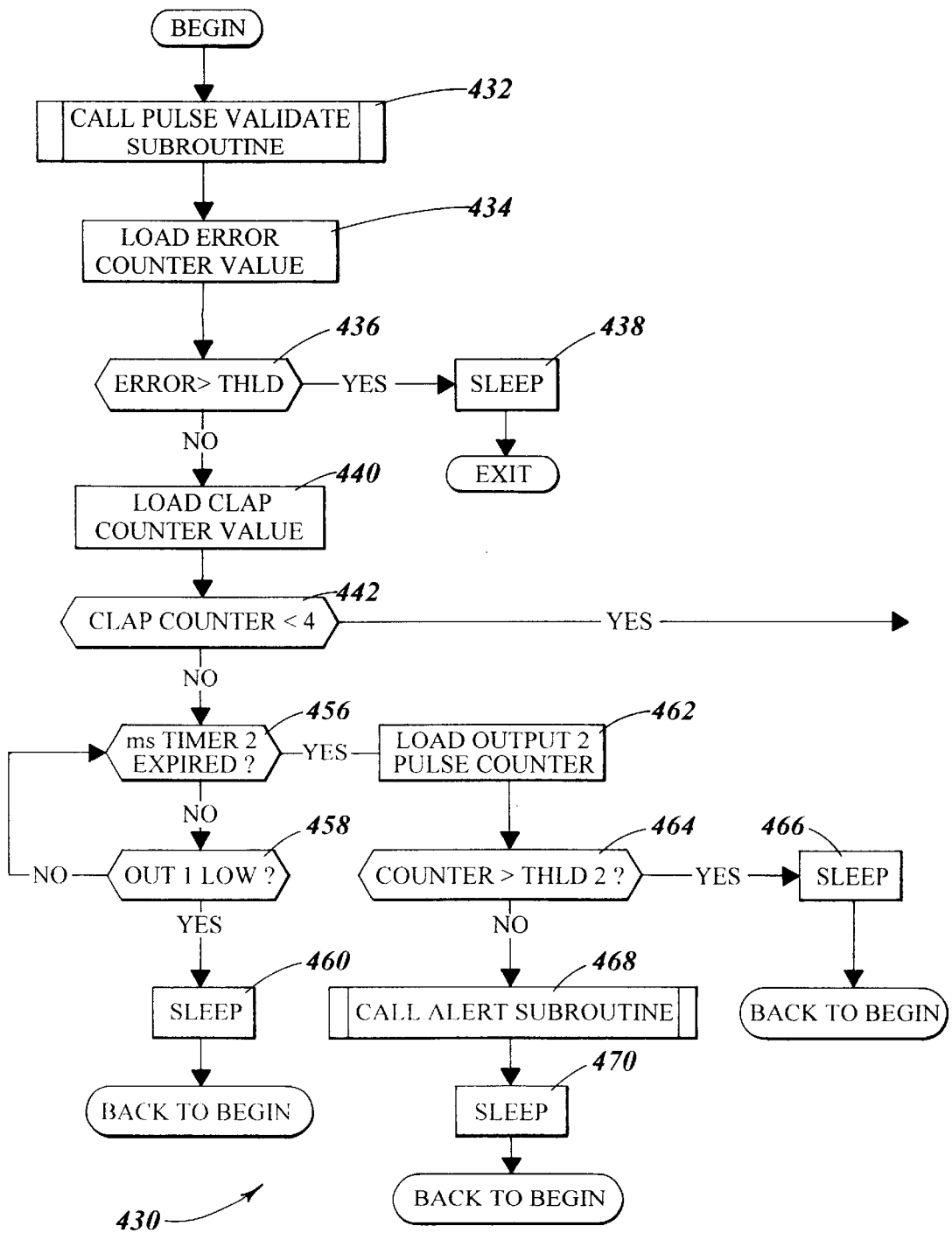
FIGS. 14a and 14b together depict a flowchart of the impulse-captured interrupt routine of the digital detector of the FIG. 13A of the impulse characteristic responsive missing object locator operable in noisy environments in accord with the present invention.
Figure 14B:
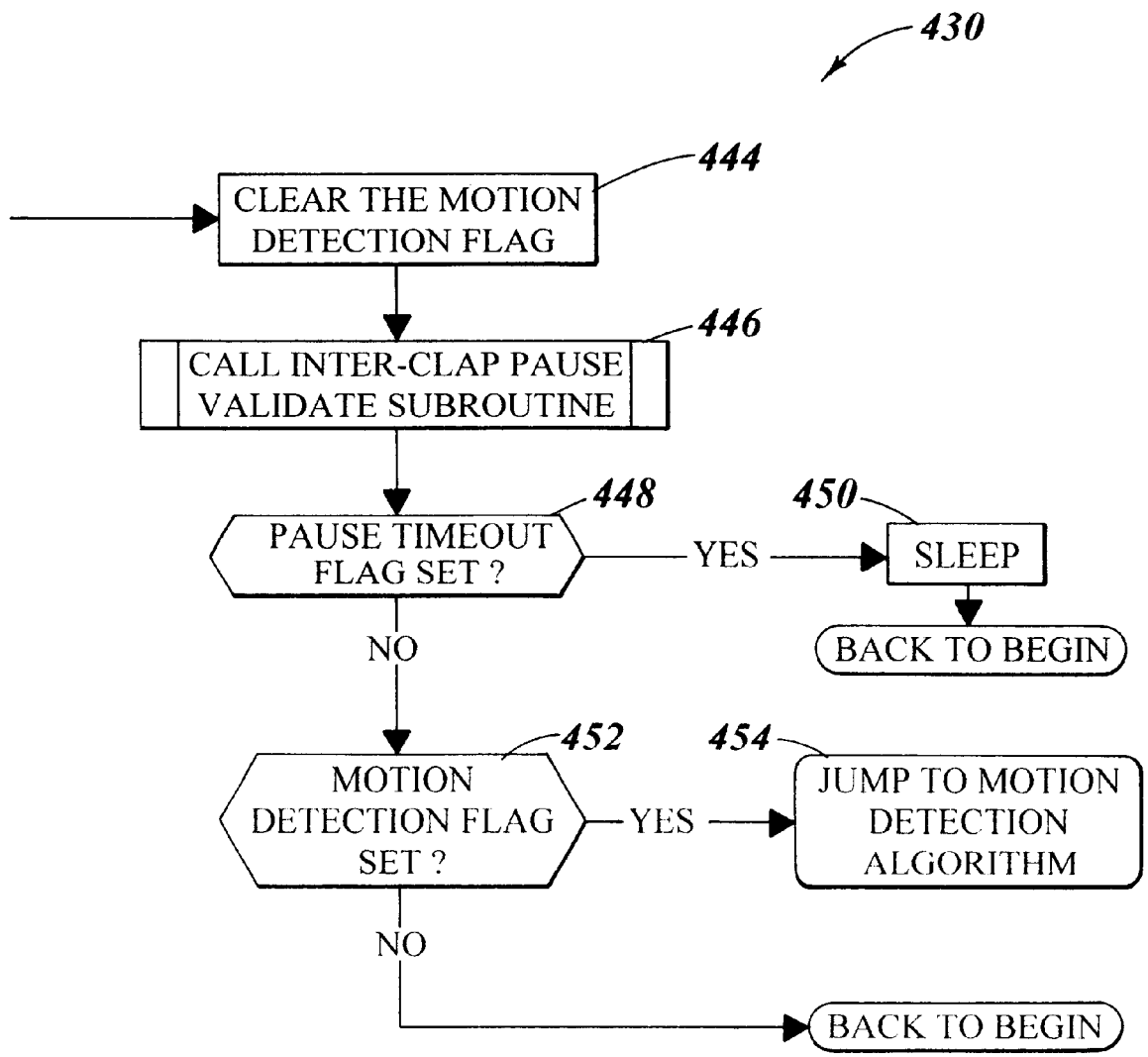

Referring now briefly to FIGS. 14a and 14b, generally designated at 430 is a flowchart of the digital detector illustrating the impulse-captured interrupt routine thereof. As shown by a block 432, upon receipt of the first impulse-captured signal of a potential actuation sequence the processor is operative to call the pulse validate subroutine.

Figure 15A:
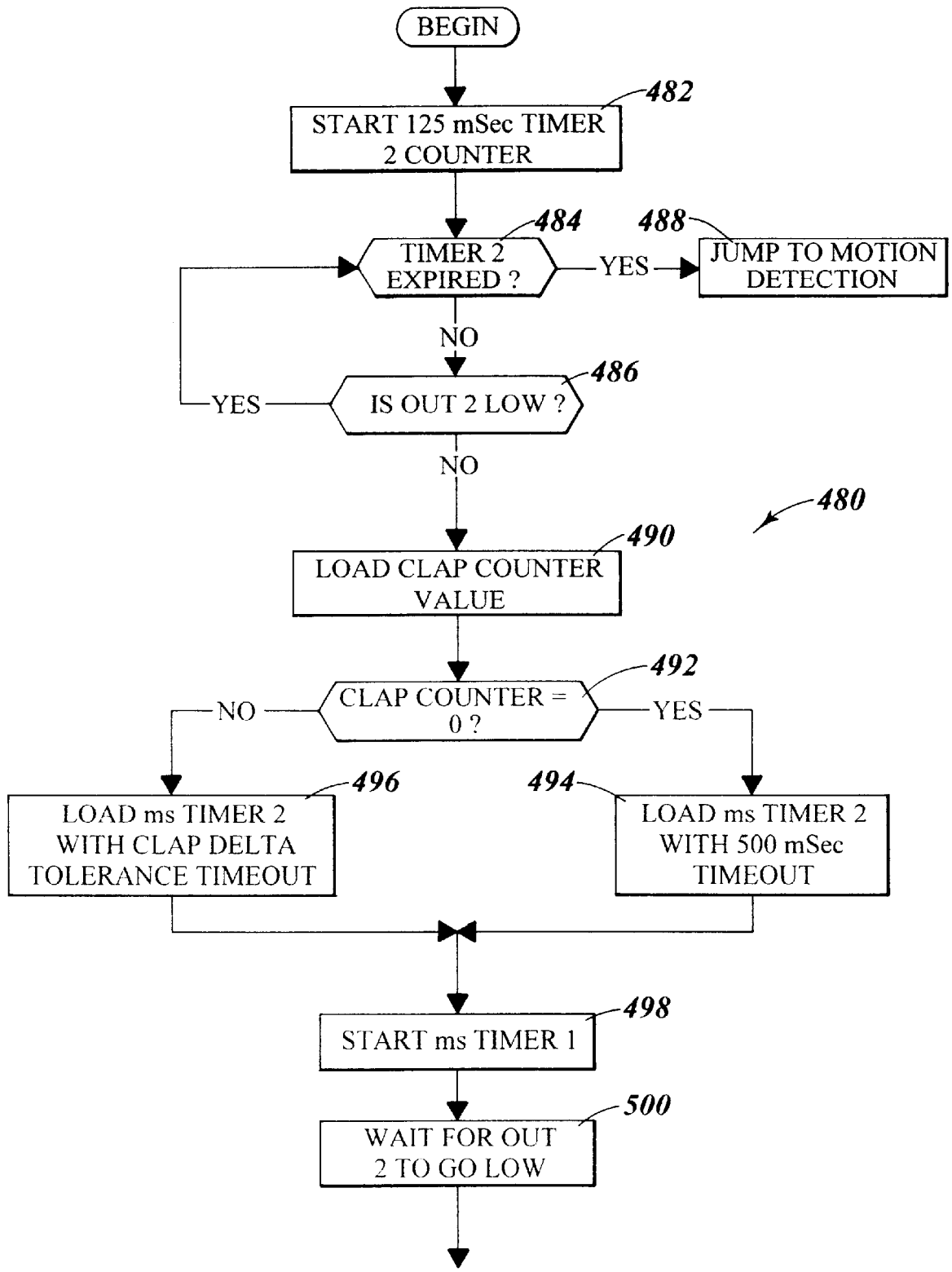
FIGS. 15a and 15b together depict a flowchart of the pulse-validate subroutine called by the impulse-captured interrupt routine of the FIG. 14 of the impulse characteristic responsive missing object locator operable in noisy environments in accord with the present invention.
Figure 15B:
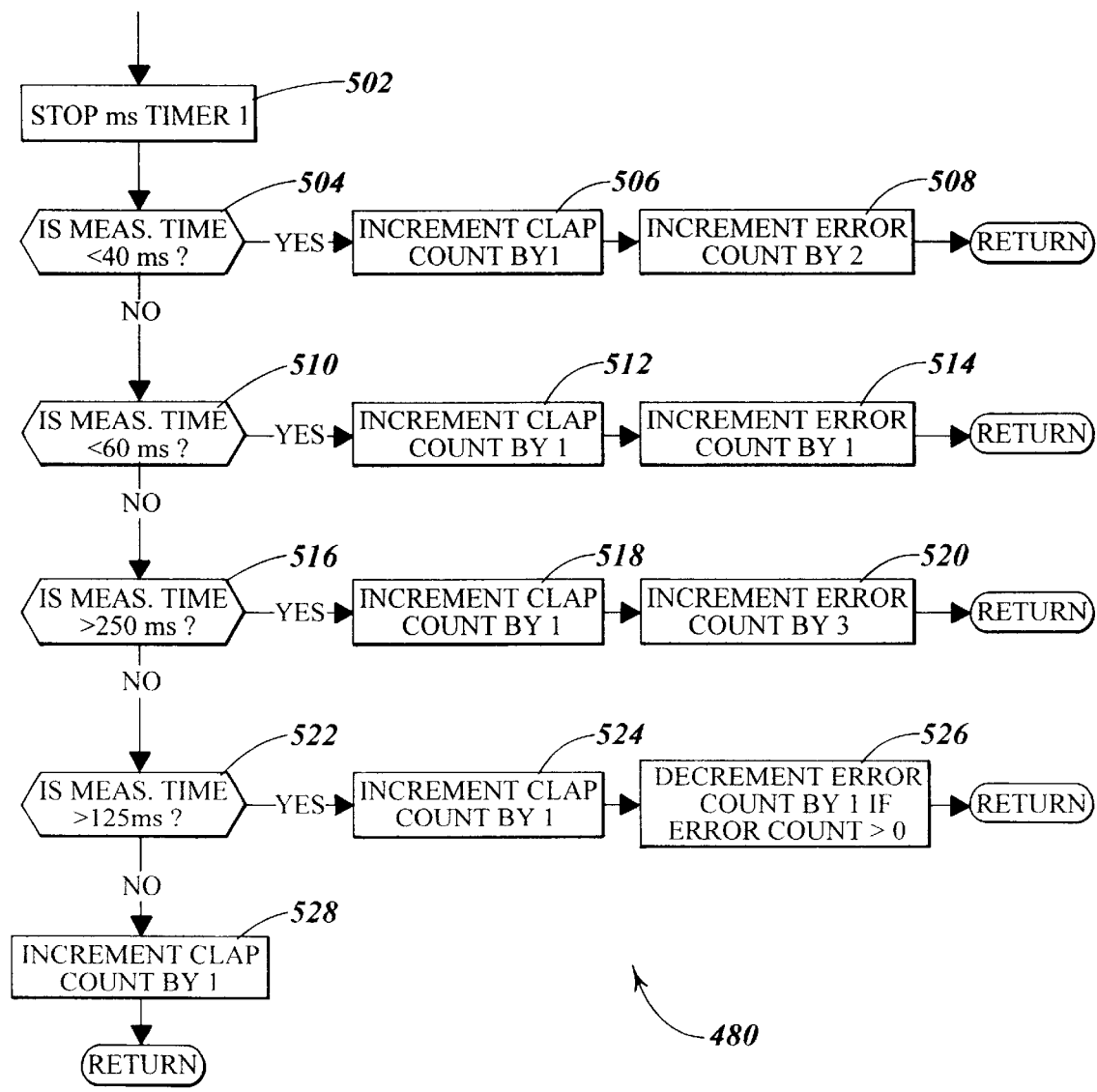

Referring now to FIGS. 15a and 15b, generally designated at 480 is a flowchart of the pulse validate subroutine. As shown by a block 482, the processor loads timer "2" for one hundred twenty-five (125) milliseconds, and as shown by blocks 484, 486, determines whether output two goes low within the time period of the count-down timer. If it does, as shown by block 488, processing jumps to the motion detection routine to be described.

Otherwise, as shown by block 490, the processor is operative to load the current value of the clap counter, and as shown by block 492, determines whether the clap count equals zero (0).

If it is, as shown by block 494, the processor is operative to load the millisecond timer "2" with a five hundred (500) millisecond timeout (representative of minimum repetition rate for potential first members of a potential actuation sequence), but if it is not, as shown by block 496, the processor is operative to load the millisecond timer "2" with clap-delta minus the tolerance (representative of the minimum repetition rate for potential subsequent members of potential actuation sequences).

As shown by block 498, the processor is next operative to start the millisecond timer "1" and, as shown by block 500, is operative to wait for output two to go low.

As shown by block 502, the processor is operative to stop the millisecond timer "1" whenever output two goes low.

The obtained time value is representative of the pulse width of output two, measured rising edge to trailing edge.

As shown by blocks 504, 506, and 508, if the measured time is less than forty (40) milliseconds, the processor is operative to increment the clap counter by one (1) and to increment the error counter by two (2), and returns to impulse-captured processing.

As shown by blocks 510, 512, and 514, if the measured time is between forty (40) milliseconds and sixty (60) milliseconds, the processor is operative to increment the clap counter by one (1) and to increment the error count by one (1), and returns to impulse-captured processing.

As shown by blocks 516, 518, and 520, if the measured time is greater than two hundred fifty (250) milliseconds, the processor is operative to increment the clap counter by one (1) and to increment the error counter by 3 (three), and returns to impulse-captured processing.

As shown by blocks 522, 524, and 526, if the measured time is greater than one hundred twenty-five (125) milliseconds and less than two hundred fifty (250) milliseconds, the processor is operative to increment the clap count by one (1) and to decrement the error counter by one (1), and returns to impulse-captured processing.

Otherwise, the measured time is between sixty (60) and one hundred twenty-five (125) milliseconds, and, as shown by block 528, the processor is operative to increment the clap count by one (1), and returns to impulse-captured processing.

Returning now briefly to FIGS. 14a and 14b, the processor then loads the output two error counter value as shown by a block 434, and determines whether the error count is greater than a threshold of three (3) as shown by a block 436. If it is, as shown by a block 438, the processor returns to sleep mode; otherwise, as shown by the block 440, the processor loads the clap counter value.

As shown by block 442, the processor then determines whether the clap counter value is less than four (4). If it is less than four (4), the processor is operative to clear a motion detect flag as shown by block 444 and to call the inter-clap pause validate subroutine as shown by a block 446.

Figure 16A:
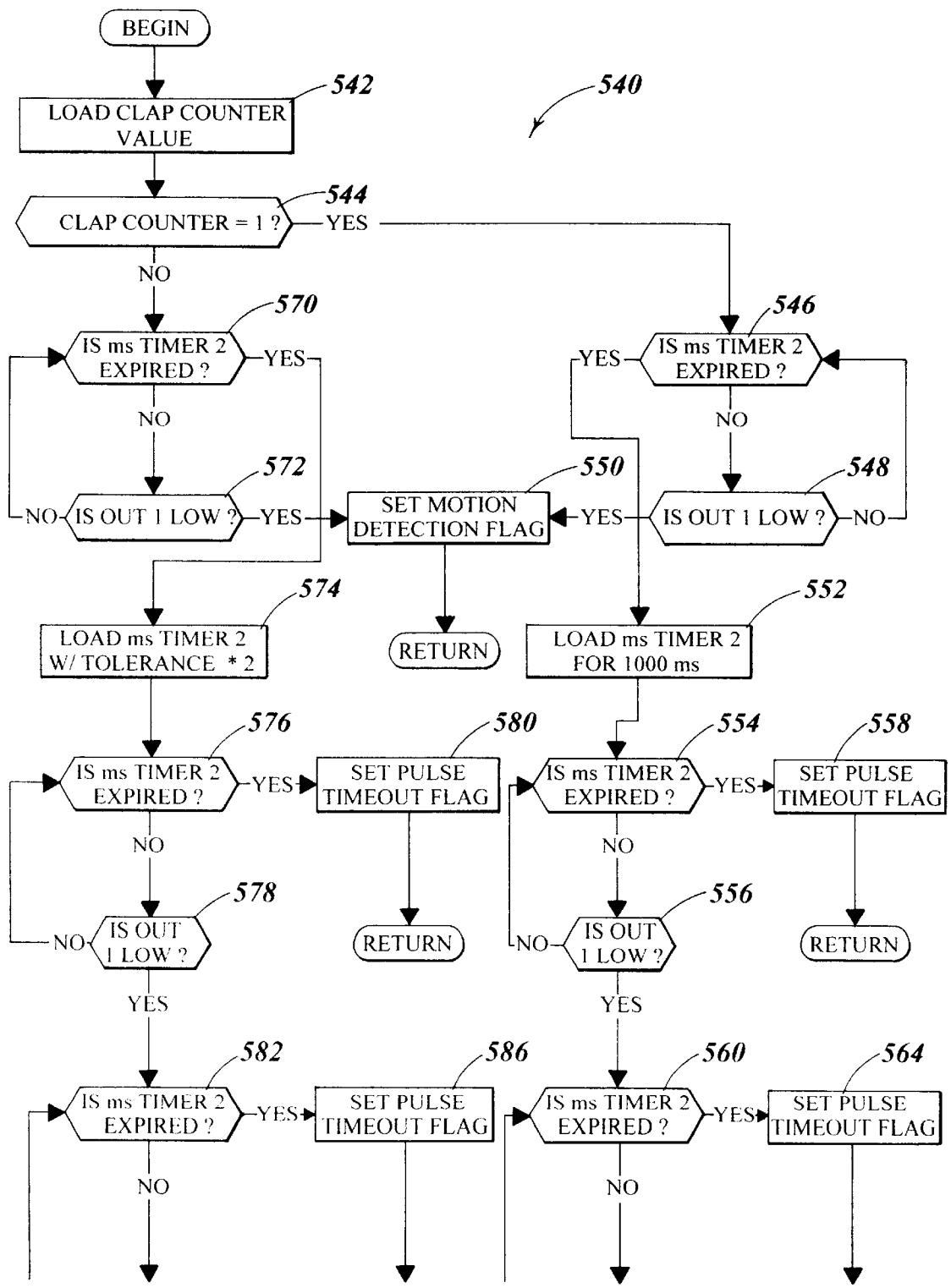
FIGS. 16a and 16b together depict a flowchart of the interclap pause-validate subroutine called by the impulse-captured interrupt routine of the FIG. 14 of the impulse characteristic responsive missing object locator operable in noisy environments in accord with the present invention.
Figure 16B:
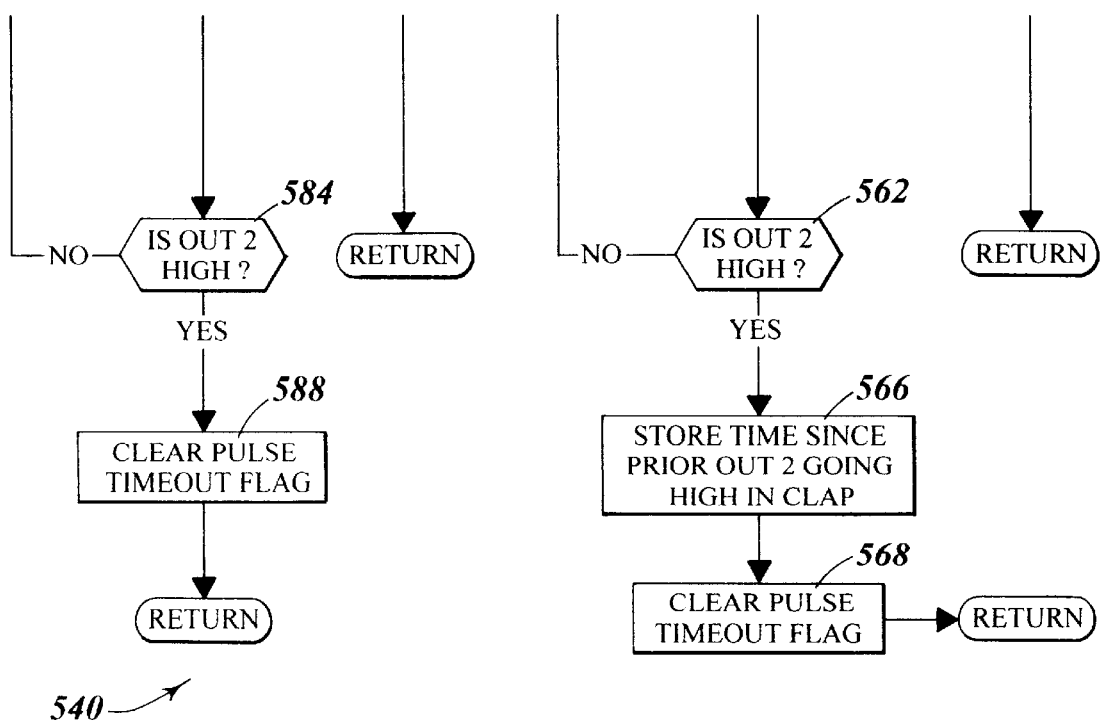

Referring now to FIGS. 16a and 16b, generally designated at 540 is a flowchart of the inter-clap pause validate subroutine. As shown by block 542, the processor is operative to load the value of the clap counter and to determine if that value is one (1) as shown by block 544.

If it is one (1), as shown by blocks 546, 548, the processor then determines whether the impulse-captured signal goes low during the duration of the count-down millisecond timer "2." If it does, as shown by block 550, the motion detector flag is set, and processing returns to the impulse-captured routine. If it does not, the count-down millisecond timer "2" is loaded for one thousand (1000) milliseconds as shown by block 552.

As shown by blocks 554, 556, if the impulse-captured signal goes low after the duration of the count-down timer, the processor is operative to set a pulse timeout flag as shown by a block 558 and to return to the impulse-captured routine.

As shown by blocks 560, 562, if the impulse-captured signal goes low during the duration of the count-down timer, the processor then determines whether the impulse-captured and noise rejected signal goes high within the duration of the count-down millisecond timer "2." If it does not, pause timeout is set as shown by block 564 and processing returns to the impulse-captured routine; otherwise, as shown by block 566, the time since the prior impulse-captured signal is stored in clap-delta, the pause timeout flag is cleared as shown by block 568, and processing returns to the impulse-captured routine. The stored time will equal one thousand (1000) milliseconds minus the remainder of the time left in the count-down timer at the time the impulse-captured and noise rejected signal occurred plus five hundred (500) milliseconds in the presently preferred embodiment.

If the clap count is not one (1), as shown by blocks 570, 572, the processor then determines whether the impulse-captured signal goes low during the duration of the count-down millisecond timer "2."

If it does, as shown by block 550, the motion detector flag is set, and processing returns to the impulse-captured routine. If it does not, the count-down millisecond timer "2" is loaded with twice the tolerance as shown by block 574.

As shown by blocks 576, 578, if the impulse-captured signal goes low after the duration of the count-down timer, the processor is operative to set the pause timeout flag as shown by a block 580 and to return to the impulse-captured routine.

As shown by blocks 582, 584, if the impulse-captured signal goes low during the duration of the count-down timer, the processor then determines whether the impulse-captured and noise rejected signal goes high within the duration of the count-down millisecond timer "2." If it does not, pulse timeout is set as shown by block 586 and processing returns to the impulse-captured routine; but if it does go high before the expiration of that time, the pulse timeout flag is cleared as shown by block 588, and processing returns to the impulse-captured routine.

Returning now again to FIGS. 14a and 14b, upon return from the inter-clap pause validate subroutine, the processor is operative to determine whether the pause timeout flag has been set as shown by block 448, and if it has, goes back to sleep mode as shown by block 450.

As shown by block 452, if the pause time out flag has not been set the processor is operative to determine whether a motion detection flag has been set. If it has, processing jumps to motion detection mode as shown by block 454, and otherwise goes back to begin.

As shown by the blocks 456, 458 thereof, if the value of the clap counter equals four (4), the processor is operative to determine whether another impulse-captured signal is received within the duration of the count-down millisecond timer "2." If there is another, the processor returns to sleep mode as shown by block 460. The detection of another impulse-captured signal after having counted the requisite number of expected triggering signals provides the detector of the invention with the false alarm rejection rate of a longer, virtual sequence of expected triggering sounds without actually having the user produce such a longer sequence of triggering sounds.

Otherwise, as shown by block 462, the processor is operative to load the value of the output "2" pulse counter.

As shown by block 464, if the value of the pulse counter is greater than an error threshold, preferably five (5), the processor goes into sleep mode as shown by the block 466; otherwise, and as shown by the block 468, the alert subroutine is called, and thereafter, the processor returns to sleep mode as shown by block 470. The alert subroutine is the same as that described above in connection with the description of the FIG. 8 and is not again separately described herein.

Figure 17:
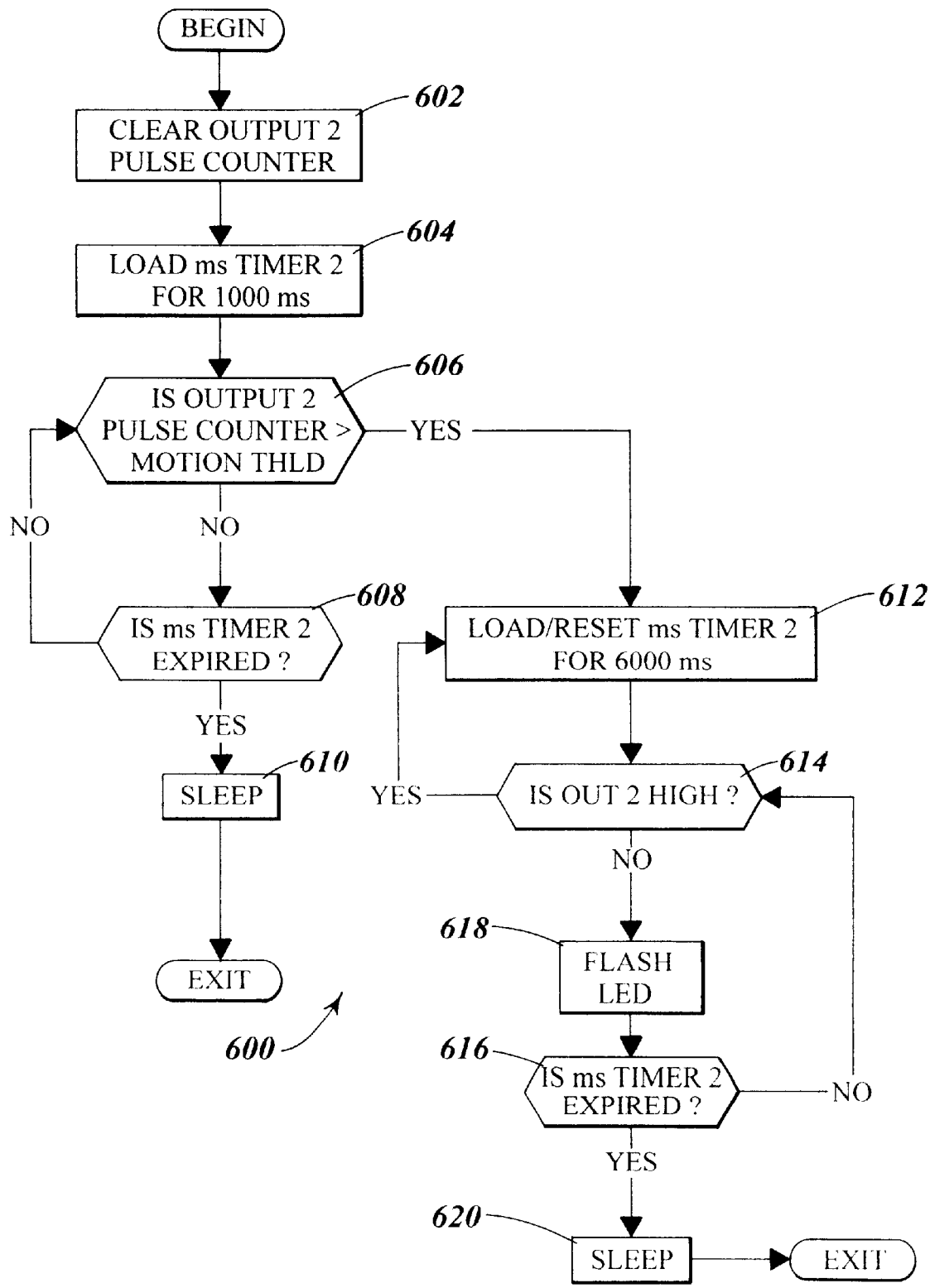
FIG. 17 is a flowchart of the motion detect routine called by the impulse-captured interrupt routine of the FIG. 14 and by the pulse validate subroutine of the FIG. 15 of the impulse characteristic responsive missing object locator operable in noisy environments in accord with the present invention.

Referring now to FIG. 17, generally designated at 600 is a flowchart illustrating one embodiment of the motion detection routine in accord with the present invention.

As shown by block 602, the processor is operative to clear the output "2" pulse counter and to load the millisecond timer "2" for one thousand "1000" milliseconds as shown by block 604.

As shown by blocks 606, 608, the processor is then operative to verify a potential motion detect condition by requiring at least one other impulse-captured and noise rejected signal within the duration of the one thousand millisecond timer "2." In the preferred embodiment, the threshold is two (2), although another motion verification threshold and window could be employed in accord with the present invention.

If verification of motion is not detected, the processor is operative to go into sleep mode as shown by block 610.

As shown by blocks 612, 614, and 616, the processor is then operative to load the count-down millisecond timer "2" preferably for six thousand (6000) milliseconds and to reset the timer every time another impulse-captured and noise rejected signal is received within the duration of that count-down timer. Processing remains in the loop between the blocks 612, 614 for an indefinite time, so long as any impulse-captured and noise rejected signals are received within the predetermined time of the count-down timer, thereby adapting itself to the prevailing noise environment.

As shown by a block 618, while in motion detection mode, the processor is optionally operative to flash an LED, not shown, to indicate to the user motion detection mode operation.

Only upon a period of quiescence that lasts for six thousand (6000) milliseconds, during which no impulse-captured and noise rejected signals are detected, does the processor go back into sleep mode, as shown by block 620.

Figure 18:
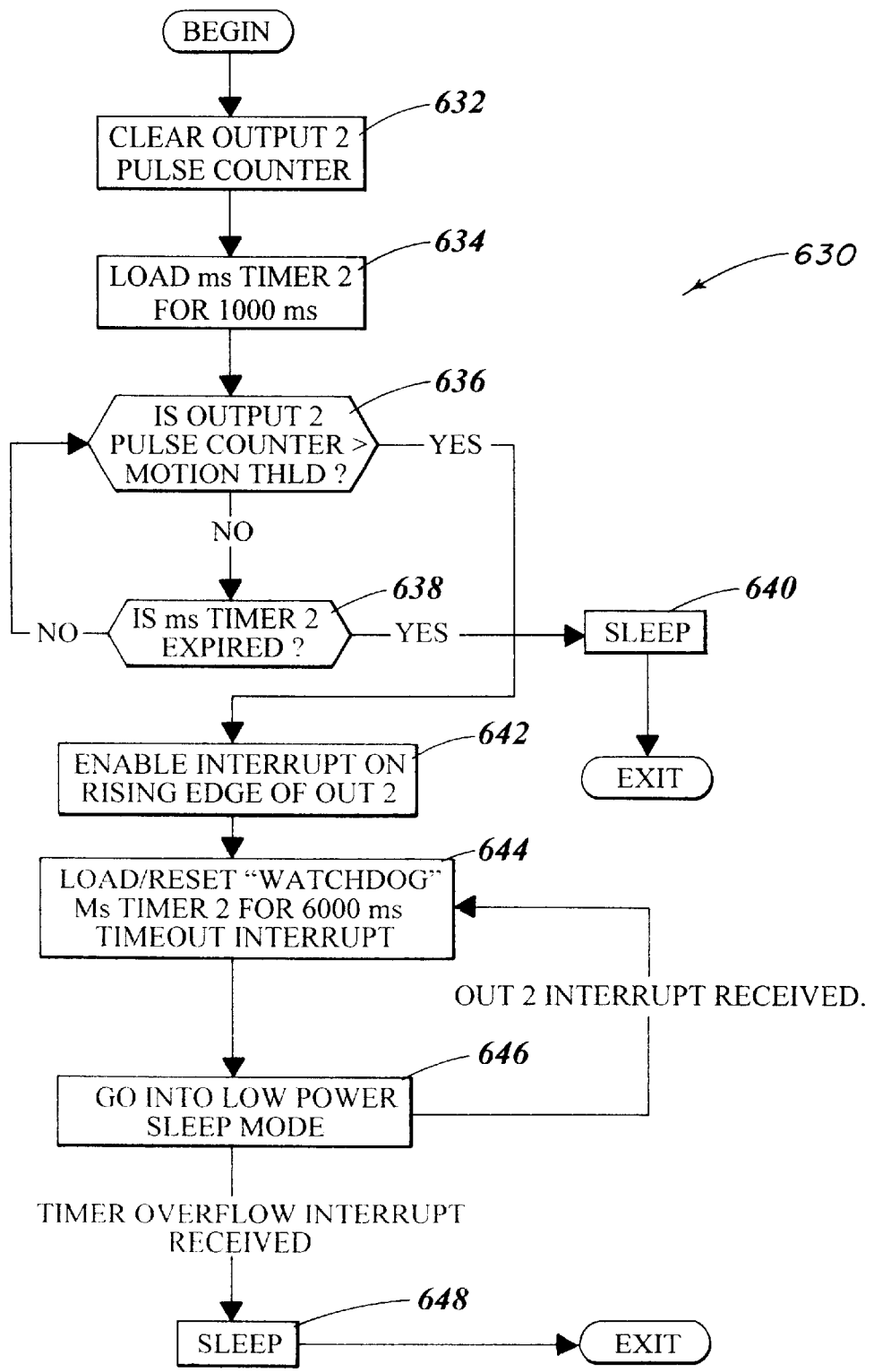
FIG. 18 is a flowchart of another embodiment of the motion detect routine called by the impulse-captured interrupt routine of the FIG. 14 and by the pulse validate subroutine of the FIG. 15 of the impulse characteristic responsive missing object locator operable in noisy environments in accord with the present invention.

Referring now to FIG. 18, generally designated at 630 is a flowchart illustrating another embodiment of the motion detection routine in accord with the present invention. The embodiment 630 differs from that of the embodiment 600 of FIG. 17 in that the processor goes into battery-conserving low-power mode for the duration of the indefinite time that impulse-captured and noise rejected signals are received during the predetermined time interval of the count-down timer "2." In this embodiment, the output "2" count-down timer is set and reset by an interrupt that is enabled on the rising edge of the impulse-captured and noise rejected signal, and returns to sleep mode by an overflow interrupt, although any other suitable technique to place the processor into battery-conserving low-power mode while motion detect processing occurs could be employed in accord with the present invention.

As shown by block 632, the processor is operative to clear the output "2" pulse counter and to load the millisecond timer "2" for one thousand (1000) milliseconds as shown by block 634.

As shown by blocks 636, 638, the processor is then operative to verify a potential motion detect condition by requiring at least one other impulse-captured and noise rejected signal within the duration of the one thousand millisecond timer "2." In the preferred embodiment, the threshold is two (2), although another motion verification threshold and window could be employed in accord with the present invention.

If verification of motion is not detected, the processor is operative to go into sleep mode as shown by block 640.

If verification is detected, the processor is operative to enable the count-down timer interrupt as shown by block 642.

As shown by blocks 644, 646, the processor is then operative to load the count-down millisecond timer "2" preferably for six thousand (6000) milliseconds and to reset the timer every time another impulse-captured and noise rejected signal interrupt is received within the duration of that count-down timer. Interrupt processing remains in the loop between the blocks 644, 646 for an indefinite time, so long as any impulse-captured and noise rejected interrupts are received within the predetermined time of the count-down timer.

As shown by block 648, upon expiration of a period of quiescence that lasts for six thousand (6000) milliseconds, during which no impulse-captured and noise rejected interrupts are detected, the detector goes back into sleep mode, and awaits another impulse-captured signal to awaken it.

Many modifications of the presently disclosed invention will become apparent to those skilled in the art having benefitted by the instant disclosure without departing from the inventive concepts. For example, any suitable impulse characteristics of the received triggering sounds may be discriminated and detected other than the attack times and slew rates of the preferred embodiments, so long as the characteristic or characteristics are selected to distinguish expected impulse or impulse-like characteristics of the triggering sounds from non-expected impulse or impulse-like triggering sounds or from other than impulse or impulse-like triggering sounds. Any suitable characteristics other than dwell time and expected repetition rates may be looked at by the digital likelihood estimator to provide a confidence measure that received sounds are indeed humanly produced triggering sounds.

What is claimed is:

1. A missing object locator responsive to an expected humanly-produced actuation sequence of triggering sounds to provide a missing object locator signal in a manner that is free from false alarms in noisy environments, comprising:

analog means including a transducer for providing analog signals in response to acoustic energy received by said transducer;

discriminator means coupled to said analog means for providing a digital pulse train in response to said analog signals; and a detector providing first and second patterns respectively representative of genuine, actuation and false, noisy sequences coupled to said discriminator means and operative in response to said digital pulse train to compare said first and second patterns to said digital pulse train and to generate said missing object locator signal if said first pattern is detected in said digital pulse train, but, if said second pattern is detected in said digital pulse train at any time prior to detection of said first pattern, said detector is operative to suspend first pattern comparison for an indefinite time, that lasts so long as any pulse train pulses following detection of said second pattern are detected in a predetermined time which is reset each time any pulse train pulses are detected in said predetermined time, and, at the expiration of said indefinite time that expires only when no pulse train pulses are detected in said predetermined time, indicating a period of quiescence for that predetermined time, said detector is operative to resume said first and second pattern and digital pulse train comparison.

2. The missing object locator of claim 1, wherein said detector is a microprocessor-implemented detector, and includes a low-power battery-conserving mode, an actuation sequence detection mode in which said comparison of said first and second patterns with said digital pulse train is accomplished, and a motion detection mode in which said suspension of said comparison is accomplished, and wherein said microprocessor-implemented detector is further operative in said motion detection mode to enter said low-power battery-conserving mode for said indefinite time that it is in said motion detection mode.

3. A parsing missing object locator responsive to an expected humanly produced actuation sequence of triggering sounds to provide a missing object locator signal, comprising:

analog means including a transducer for providing analog signals in response to acoustic energy received by said transducer;

discriminator means coupled to said analog means for providing a digital pulse train in response to said analog signals; and parsing pulse train processor means coupled to said discriminator means and responsive to each said digital pulse for (1) counting a pulse as a first member of a potential actuation sequence of pulses if no pulse has already been counted as a first member of a potential actuation sequence of pulses; for (2) counting a pulse if some pulse has already been counted as a first member of a potential actuation sequence of pulses as another member of said potential actuation sequence of pulses if it, and the prior pulse of said potential actuation sequence of pulses, satisfy a preselected criteria selected to define what is expected for subsequent pulses to be valid members of said expected actuation sequence of pulses, but if it does not satisfy said preselected criteria, to reset the count and return to (1); and otherwise for (3) providing said missing object locator signal representative of detection of an expected actuation sequence if a certain number has been counted.

4. The parsing missing object locator of claim 3, wherein said criteria is a minimum repetition rate.

5. The parsing missing object locator of claim 3, wherein said criteria is a maximum repetition rate.

6. The missing object locator of claim 3, wherein said criteria is a clap-delta rate representative of the actual way the user produces triggering sounds.

7. A missing object locator responsive to an actuation sequence of a certain number of triggering sounds humanly-produced by a user to provide a missing object locator signal that enjoys a false alarm rejection rate of a virtual actuation sequence longer than said actuation sequence without requiring the user to actually produce that longer sequence, comprising:

analog means including a transducer for providing analog signals in response to acoustic energy received by said transducer;

discriminator means coupled to said analog means for providing a digital pulse train in response to said analog signals; and detector means defining a pattern representative of a genuine actuation sequence that specifies a certain number of triggering sounds and at least one interval that is permissible for triggering sounds to follow one another in succession coupled to said discriminator means and responsive to said digital pulse train for providing said missing object locator signal if said certain number of said pattern is detected in said digital pulse train, and if, no pulse of said pulse train following detection of said certain number of said pattern is detected in one of said at least one interval that is permissible for triggering sounds to follow one another in succession.

8. The missing object locator of claim 7, wherein said at least one interval is a variable interval defined by minimum and maximum repetition rates.

9. The missing object locator of claim 7, wherein said at least one interval is defined by a clap-delta rate representative of the actual way the user produces triggering sounds.

10. A parsing missing object locator responsive to an actuation sequence of a certain number of triggering sounds humanly-produced by a user to provide a missing object locator signal that is operable to prevent false alarms in noisy environments, comprising:

analog means including a transducer for providing analog signals in response to acoustic energy received by said transducer;

discriminator means coupled to said analog means for providing a digital pulse train in response to said analog signals; and parsing detector means defining a predetermined first pattern selected to specify what is expected for triggering sounds to be genuine members of an expected actuation sequence and defining a predetermined second pattern selected to specify spurious triggering sounds coupled to said discriminator means and responsive to each digital pulse of said digital pulse train for (1) counting every pulse of the pulse train as a member of a potential actuation sequence if it conforms to said predetermined first pattern and simultaneously counting it as an error if it conforms to said predetermined second pattern; for (2) resetting both the error as well as the actuation sequence counts if the error count exceeds a first error threshold and if the number of counts corresponding to a genuine actuation sequence has not been counted and returning to (1); and otherwise for (3) providing said missing object locator signal if the number of counts corresponding to said genuine actuation sequence has been counted and if the errors counted do not exceed a second error threshold.

11. The parsing missing object locator of claim 10, wherein said second pattern is defined at least in part by dwell time of said pulses of said pulse train, and wherein said first threshold is responsive to dwell time errors.

12. The parsing missing object locator of claim 10, wherein said second pattern is defined at least in part by total number of pulses beyond a pulse threshold, and wherein said second threshold is the same as said total pulse threshold.

13. The missing object locator in any one of claims 1, 3, 7, or 10, wherein said analog signals have attack rates, and wherein said discriminator means is responsive to the attack rates of each of the analog signals to provide said pulses if their attack rates exceed a threshold representative of genuine, impulse triggering sounds.

* * * * *